United States Patent [19]

Imanaka et al.

[11] 3,923,790

[45] Dec. 2, 1975

[54] DIAZA-OXA-BICYCLODECANE DERIVATIVES AND ACYL DERIVATIVES THEREOF

[75] Inventors: Hiroshi Imanaka, Ikeda; Takashi Kamiya, Suita; Shizuo Maeno, Osaka; Toshio Miyoshi, Ibaraki; Norimasa Miyairi, Suita; Hatsuo Aoki, Ikeda; Masanobu Kohsaka, Suita; Tadaaki Komori, Takatsuki; Heiichi Sakai, Ikeda, all of Japan

[73] Assignee: Fujisawa Pharmaceutical Co., Ltd., Osaka, Japan

[22] Filed: Apr. 23, 1974

[21] Appl. No.: 463,382

Related U.S. Application Data

[63] Continuation-in-part of Ser. No. 188,554, Oct. 12, 1971, abandoned.

[30] Foreign Application Priority Data

Oct. 12, 1970 Japan.................................. 45-89840

[52] U.S. Cl.......... 260/239.3 B; 195/28 R; 424/250
[51] Int. Cl.$^2$....................................... C07D 498/08
[58] Field of Search ............................ 260/239.3 B

*Primary Examiner*—Henry R. Jiles
*Assistant Examiner*—Robert T. Bond

[57] ABSTRACT

An antibiotic WS-4545 and the acyl derivatives thereof, which are active against a pathogenic bacteria and useful as an effective antimicrobial agent in treatment of infectious diseases caused by bacteria, the antibiotic WS-4545 being produced by fermentation of Streptomyces sapporonensis ATCC 21532 and its mutants in a nutrient medium and the acyl derivatives of said antibiotic being prepared by acylating said antibiotic with an acylating agent.

10 Claims, 4 Drawing Figures

DIAZA-OXA-BICYCLODECANE DERIVATIVES AND ACYL DERIVATIVES THEREOF

CROSS-REFERENCE TO RELATED APPLICATION

This invention is a continuation-in-part application of copending application Ser. No. 188,554, filed Oct. 12, 1971, now abandoned.

DETAILED DESCRIPTION

Figure 1:
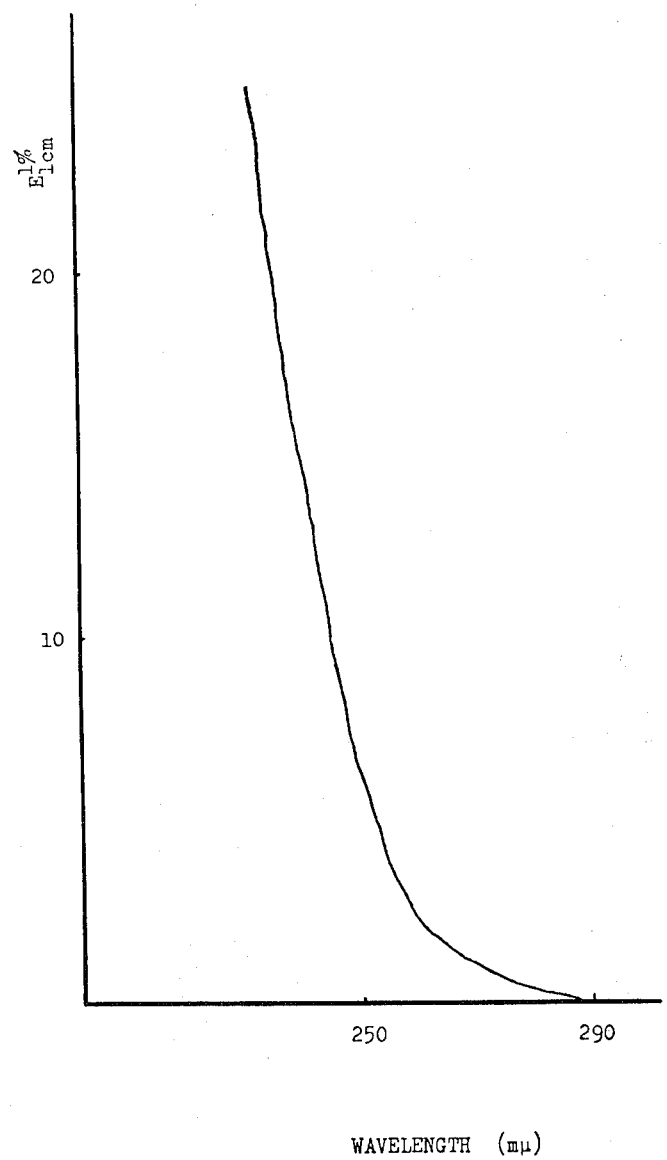

This invention relates to a new and effective antibiotic and derivatives thereof which are active against a number of microorganisms. More particularly, it relates to a new and effective antibiotic WS-4545 and acyl derivatives thereof, to methods of their production, to pharmaceutical composition comprising the same, and to a method of using the same therapeutically in the treatment of infections.

Accordingly, it is one object of this invention to provide the effective antibiotic WS-4545 and the acyl derivatives thereof which are active against a number of microorganisms, especially gram negative, for example, Escherichia and Salmonella species.

Another object of this invention is to provide a method for production of the antibiotic WS-4545 by fermentation of Streptomyces sapporonensis and its mutants in a nutrient medium.

A further object of this invention is to provide a method for preparation of the acyl derivatives of the antibiotic WS-4545 by acylating the same.

A further object of this invention is to provide pharmaceutical compositions comprising, as effective antibacterial agents, such antibiotic WS-4545, the acyl derivatives thereof and their salts.

Still another object of this invention is to provide a method of treating infectious diseases caused by bacteria in humans and animals.

Other objects of this invention and advantageous features thereof will become apparent as the description proceeds.

The antibiotic of this invention is produced in a fermentative process under controlled conditions using a new species of Streptomyces named by us Streptomyces sapporonensis.

THE MICROORGANISM

The microorganism useful for the preparation of the new antibiotic WS-4545 is a newly discovered species of Streptomyces isolated from a soil sample collected at the city of Sapporo in JAPAN. A culture of the living organism has been deposited with, and added to a permanent stock culture collection of, the American Type Culture Collection, the number ATCC 21532 and is hereinafter designated as Streptomyces sapporonensis.

It is to be understood that, for the production of the new antibiotic, this invention is not limited to the use of the particular organism described herein or of organisms fully answering the growth and microscopic characteristics described herein which are given for illustrative purpose. This invention also may include the use of antibiotic WS-4545-producing mutants produced from the described organism by conventional means, for example, treatment with X-rays, ultraviolet radiation or nitrogen mustards, etc.

Streptomyces sapporonensis ATCC 21532 shows the morphological, macroscopic, microscopic and biochemical properties as follows:

Microscopic Morphology

The morphology of Streptomyces sapporonensis ATCC 21532, when grown on sucrose nitrate agar and starch ammonium agar at 30°C for 10 to 14 days is given below. The aerial hyphae is long and straight and has a whorl. The conidium is chain-like.

Cultural and Physiological Characteristics

The cultural and physiological characteristics of new strain Streptomyces sapporonensis ATCC 21532 in a number of media are listed below. The observation was made after incubation at 30°C for 10 - 14 days. The incubation period and temperature are the same as those described herein unless otherwise indicated.

Czapek's agar

White, faint growth; no aerial mycelium; no soluble pigment.

Starch-ammonium agar

Pale orange growth in small colonies with pale orange surface; no aerial mycelium; no soluble pigment. Diastatic action is weak.

Glucose-asparagine agar

Brown growth in small colonies; thin and white powdery aerial mycelium; no soluble pigment.

Calcium-malate agar

White growth; thin and pale brownish white powdery aerial mycelium; no soluble pigment.

Tyrosine agar

Dark brown growth in small colonies; no aerial mycelium; no soluble pigment.

Bouillon agar

Pale yellow; colony-like growth; white powdery serial mycelium; no soluble pigment.

Bennett's agar

Brown colony-like growth, with flat and wrinkled surface; thin and white powdery aerial mycelium; no soluble pigment. This culture grows well at 37°C as well as 30°C.

Glucose-Bouillon

Growth in white lump. precipitated; no aerial mycelium; no soluble pigment.

Glucose-Czapek's solution

Whit Colony-like growth, precipitated; no aerial mycelium; no soluble pigment.

Litmus milk

Faint growth; no aerial mycelium; no soluble pigment. There is a slight peptonization and negative coagulation.

Gelatin stab (15° - 20°C, 20 days incubation Faint growth; no aerial mycelium; no soluble pigment. Faint positive liquefaction is observed.

Potato plug

Pale brown colony-like growth with wrinkled surface; pale brown powdery aerial mycelium; no soluble pigment.

Cellulose

No growth.

Optimal Condition for Growth

Temperature: 25° – 37°C, pH: 6 – 8.

Utilization of Carbon Sources

The utilization of carbon sources was carried out by the Pridham-Gottlieb method. The observation was made after incubation at 30°C for 7 days.

| Source of Carbon | Growth |
|---|---|
| Xylose | – |
| Arabinose | – |
| Mannose | – |
| Fructose | – |
| Glucose | ± |
| Rhamnose | – |
| Sucrose | – |
| Lactose | – |
| Trehalose | ± |
| Raffinose | – |
| Mannitol | – |
| Inositol | ± |
| Salicin | – |
| Negative Control | – |

Note:
The symbol "+" means utilization, "±" probable utilization and "–" no utilization.

THE ANTIBIOTIC

The new antibiotic WS-4545 of this invention is produced when *Streptomyces sapporonensis* as mentioned above is grown in a nutrient medium under controlled submerged aerobic conditions. A wide variety of nutrient media may be used in the growing stages of the fermentative process.

It has been found that better results are obtained when an aqueous medium containing an assimilable carbon source and an assimilable nitrogen source or a proteinaceous material is employed.

Assimilable sources may include polyhydric alcohols and mono-, di- and polysaccharides, such as glucose, fructose, maltose, lactose, sucrose, sugar, starch, corn starch, dextrin, molasses, glycerol and the like.

Suitable assimilable nitrogen sources and proteinaceous material are understood to include natural nitrogen ones such as corn steep liquor, soybean meal, soybean oil, cottonseed meal, gluten meal, corn meal, dried yeast, yeast extract, peptone, animal peptone liquors, meat extract, casein hydrolysate, etc. as well as inorganic and organic nitrogen ones such as ammonium salts (e.g. ammonium nitrate, ammonium sulphate, ammonium phosphate, etc.), urea and the like.

Carbon sources and nitrogen sources, though advantageously employed in combination, need not be used in pure form because the less pure materials, which contain traces of growth factors and considerable quantities of mineral nutrients, are alwo suitable for use. When desired, there may be added to the medium mineral salts such as calcium carbonate, sodium or potassium phosphate, sodium or potassium chloride, magnesium salts, copper salts and the like. If necessary, expecially when foaming occurs in the culture medium, a deforming agent such as liquid paraffin, fatty oil, plant oil, mineral oil, silicones, etc. may be added to the fermenting medium.

As in the case of the preferred methods used for the conventional production of other antibiotics, submerged aerobioc conditions are also preferred for the production of the new antibiotic. For the production of comparatively small quantities of the antibiotic, the submerged culture means may be carried out in small flasks or bottles, which are shaken or stirred by suitable mechanical means. However, large volumes of the inoculated nutrient medium can be fermented in large tanks or vats which are customarily employed in the fermentation industry. For the production of large amounts of the antibiotic, it is preferable to use the vegetative form of the micro-organism for inoculation in the tanks or vats, in order to avoid a growth lag in the process of production of the antibiotic. Accordingly, it is desirable first to produce a vegetative inoculum of the micro-organism by inoculating a relatively small quantity of culture medium with the spore or mycelial form of the micro-organism and then to transfer the vegetative inoculum aseptically to large tanks or vats. The medium in which the vegetative inoculum is produced can be the same as or different from the medium used for the production of the antibiotic.

Agitation and aeration of the culture medium may be accomplished in a variety of ways. Agitation may be provided by a propeller or similar mechanical agitation equipment, by revolving or shaking the fermenter, by various pumping equipment or by the passage of sterile air through the medium. Aeration may be effected by passing sterile air through the fermentation mixture.

Usually, the fermentation conducted at a temperature of about 25°C to 37°C, preferably about 30°C, for a period of 30 to 50 hours. At the end of this period, a substantial amount of the antibiotic is formed.

In order to isolate the antibiotic WS-4545, the mycelium may be separated from the culture broth by conventional means, for example, centrifugation or filtration. Most of the antibiotic is found in the filtrate. The antibiotic can be recovered from the culture filtrate by a conventional method, for example, by the addition of organic solvent or by adsorption technique which is commonly used for the recovery of the other antibiotics.

Thus, a water-miscible organic solvent can be added to the filtrate to reduce the solubility of impurities which can then be removed and the remaining aqueous phase evaporated to give the desired antibiotic. Examples of solvents which can be used for this purpose include pyridine, alcohols, such as methanol, ethanol and butanol, and aqueous solutions of water-miscible organic solvents, for example, aqueous alcohols, such as aqueous methanol, ethanol and butanol. There may also be used mixtures of water-miscible and water-immiscible organic solvents, in which case the desired antibiotic is extracted by the water-immiscible organic solvent. Thus, there may be used mixtures of an alcohol with other organic solvents, such as a ketone (e.g. acetone), a halogenated hydrocarbon (e.g. chloroform), an alkyl ester of a fatty acid (e.g. ethyl acetate), benzene or pyridine.

Alternatively, the antibiotic can be recovered from the filtrate with an adsorbing agent such as diatomaceous earth, activated alumina, silica gel, activated carbon, silicic acid and the like. The antibiotic adsorbed in said adsorbent is readily eluted from the adsorbent by using an appropriate organic solvent where it is soluble, for example, pyridine, an alcohol, an aqueous alcohol or a mixture of an alcohol with another organic solvent.

A suitable method for isolating the antibiotic from the extract or the eluate comprises the evaporation of the solvent to a relatively small volume and the precipitation of the antibiotic by addition of a suitable solvent where the antibiotic is insoluble.

The antibiotic can be purified by recrystallization or by chromatography. Solvents which may be used for recrystallization includes, for example, acetone, aqueous acetone, an alcohol (e.g. methanol, ethanol), an aqueous alcohol, ethyl acetate and the like. Adsorbing agents used for recovering the antibiotic may also be employed effectively for chromatographic purification. As eluents, there may be used those which can also be employed for recovering the antibiotic.

Properties of the antibiotic WS-4545 which is isolated in this manner are given hereinafter.

The antibiotic WS-4545 has the following physical and chemical properties:

WS-4545 crystallizes in the form of white crystals having basic properties. It is soluble in water, methanol, ethanol and pyridine, sparingly soluble in acetone and ethyl acetate, and insoluble in ether, chloroform, benzene and n-hexane.

The molecular weight, as determined from mass spectrum data, appears to be 302.

The specific rotation is $[\alpha]_D^{23} = 63.5°$ (C=1.00 percent (weight-volume) in methanol).

Elementary analysis gives the following results: carbon = 47.44%; hydrogen = 6.16; nitrogen = 9.36; oxygen (by difference) = 37.04.

The foregoing values, when employed in calculating the empirical formula of WS-4545, give the empirical formula $C_{12}H_{18}N_2O_7$.

The colour reactions of WS-4545 are as follows: positive to Fehling's and Molisch's tests; decolourises of potassium permanganate solution; faintly positive reaction with ferric chloride; negative reaction in ninhydrin, Tollen's and Ehrlich's tests.

The antibiotic WS-4545 was subjected to thin layer chromatography on silica-gel (using Kieselgel G available from Merck, trade name) using various developing solvent systems. 1% potassium permanganate solution containing 2% sodium carbonate was used as a colouring agent. The following Rf values were determined:

Table: The Rf values of WS-4545

| Solvent Systems | Rf |
|---|---|
| n-butanol:acetic acid:water* (4 : 1 : 5) | 0.41 |
| n-butanol:pyridine:water (4 : 1 : 1) | 0.55 |
| chloroform : methanol (5 : 1) | 0.39 |
| ethyl acetate : methanol (1 : 1) | 0.63 |
| benzene:methanol:chloroform (1 : 1 : 1) | 0.41 |

*Note:
The upper layer of said mixture was used.

The antibiotic WS-4545 crystallizes in different crystal forms according to the conditions used in crystallization. It has been ascertained microscopically that the crystals produced in Example 1 is rhombic system and the crystals in Example 2 is monoclinic system. The X-ray diffraction analysis gives the following results:

|  | Crystal produced in Example 1 | Crystal produced in Example 2 |
|---|---|---|
| Crystal system: | rhombic | monoclinic |
| Space Lattice: | a 11.7 A | a 10.1 A, β 101° |
|  | b 12.7 A | b 10.9 A |
|  | c 8.8 A | c 6.6 A |
| Density: | 1.54 g/cm³ | 1.46 g/cm³ |

Figure 2:
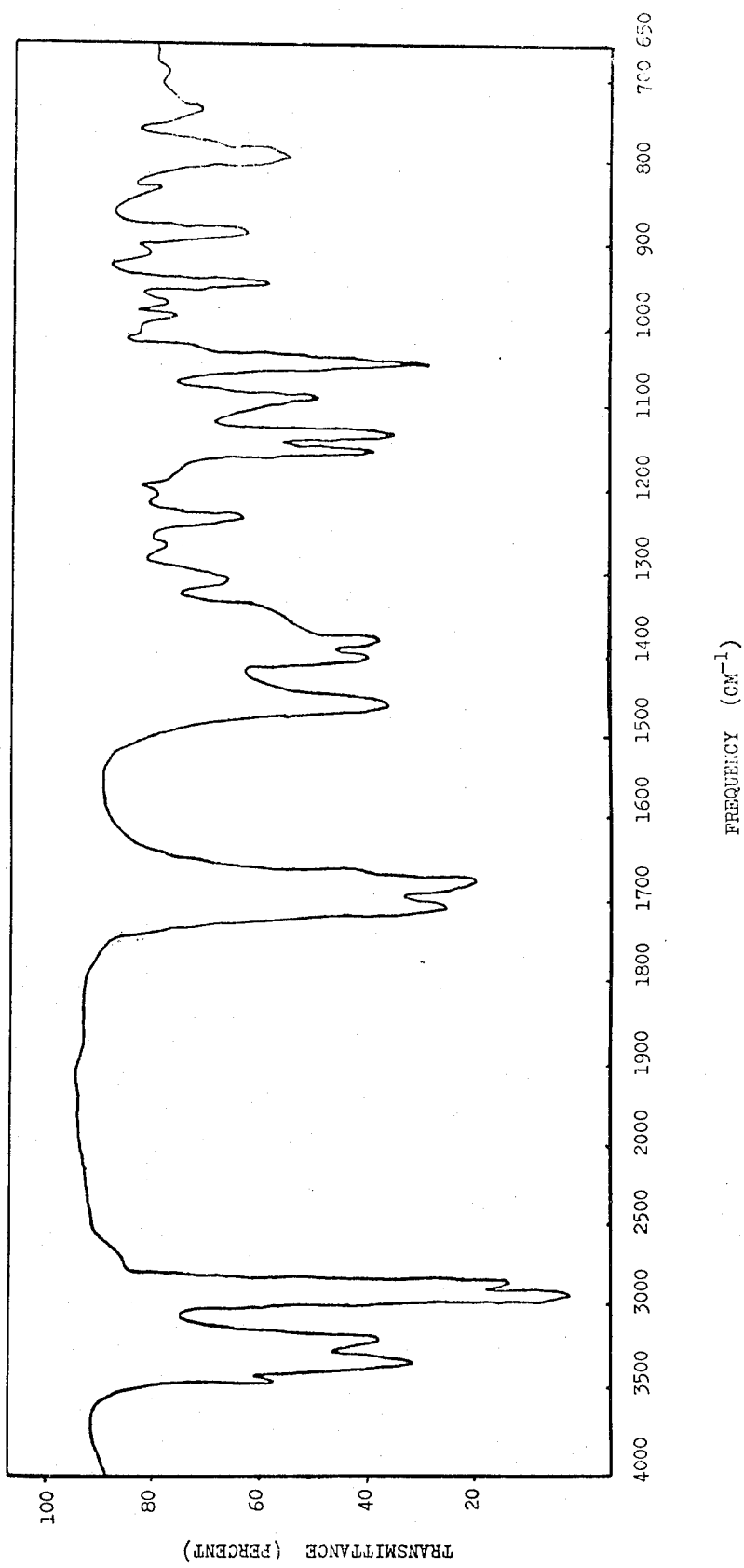

The crystal of rhombic system melts at 187° - 189°C (decomposition). The ultra-violet spectrum, which is given in FIG. 1 of the accompanying drawings, does not show a specific absorption. The infra-red spectrum (suspended in Nujol mull) is given in FIG. 2 of the accompanying drawings at the following frequency (cm⁻¹):

3400, 3300, 3160, 2900, 2840, 1703, 1670, 1450, 1390, 1370, 1295, 1260, 1220, 1195, 1140, 1120, 1080, 1030, 970, 960, 935, 895, 870, 820, 785, 725, 680.

Figure 3:
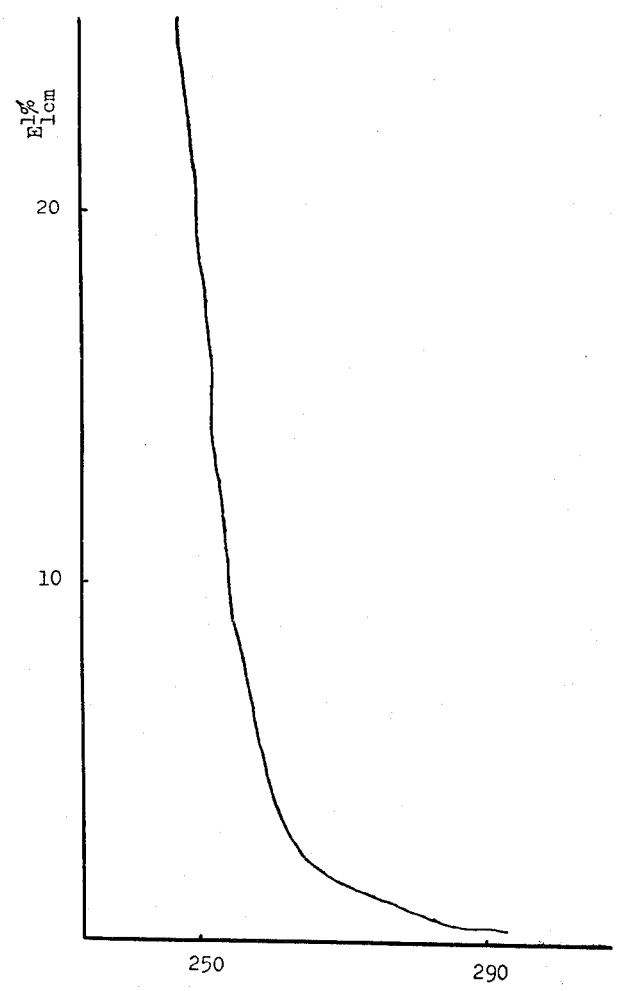
Figure 4:
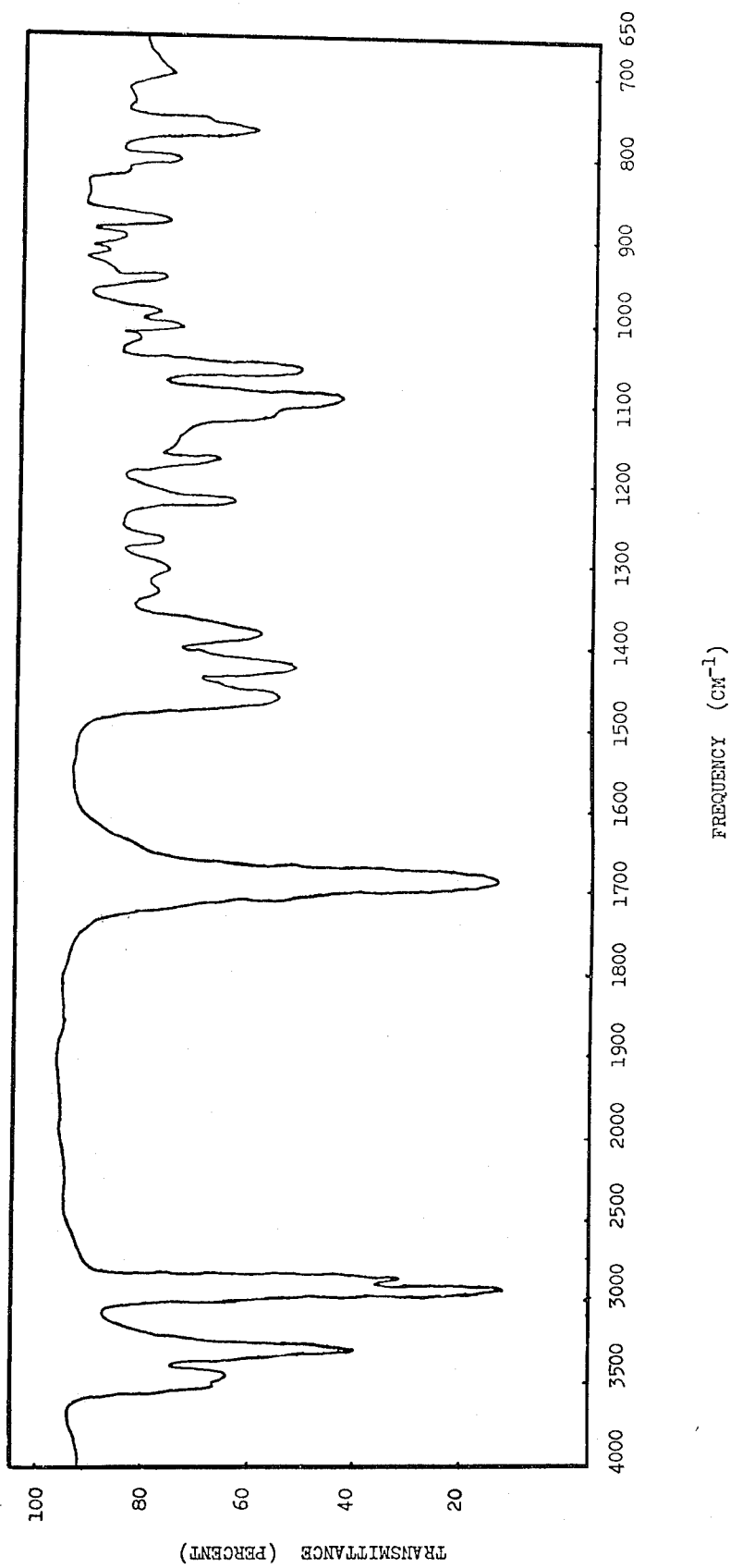

The crystals of monoclinic system melt at 188° - 191°C (decomposition). The ultra-violet spectrum, which is given in FIG. 3 of the accompanying drawings, does not show a specific absorption. The infra-red (spectrum suspended in Nujol Mull) is given in FIG. 4 of the accompanying drawings and shows peaks at the following frequency (cm⁻¹):

3500, 3400, 3270, 2900, 2840, 1685, 1640, 1455, 1417, 1375, 1330, 1300, 1260, 1245, 1210, 1160, 1135, 1125, 1105, 1085, 1050, 1010, 995, 980, 940, 920, 900, 885, 870, 840, 805, 795, 760, 725, 690, 675.

Crystals of the different crystal systems are easily convertible mutually by adding a seed of one crystal to the solution of the other crystal just before crystal is formed in crystallization process. That is, when crystals of rhombic system are recrystallized from solvent, for example, warm water, hot aqueous ethanol, hot acetone, hot methanol or hot ethanol, the addition of seed crystals of monoclinic system to the solution prior to the formation of precipitates in the solution produces the crystals of monoclinic system. On the other hand, when crystals of monoclinic system are recrystallized from solvent, for example, warm water, hot aqueous ethanol or hot acetone, the addition of seed crystals of rhombic system to the solution prior to the formation of precipitates in the solution produces crystals of rhombic system. From the aforementioned fact, it can be concluded that crystals of rhombic system and monoclinic system lie in relation of polymorphism.

Nuclear magnetic resonance spectrum of the antibiotic WS-4545 shows the following signals (τ (ppm); DMSO-d6 solution, TMS as internal standard).

| 8.81 | : 3H singlet |
|---|---|
| 7.45 – 7.67 | : 2H multiplet |
| 6.30 – 6.87 | : 2H multiplet |
| 6.10 – 6.40 | : 2H multiplet |
| 6.09 | : 1H doublet |
| 5.58 | : 1H triplet |
| 4.95 | : 1H multiplet |
| 4.93 | : 1H singlet |
| 4.87 | : 1H doublet |
| 4.63 | : 1H multiplet |
| 3.27 | : 1H singlet |
| 1.38 | : 1H singlet |
| 1.05 | : 1H singlet |

From the X-ray diffraction and also interpretation of the aforementioned physical and chemical properties, the chemical structure of the antibiotic WS-4545 may be assigned with confidence to be as follows:

Chemical Structure

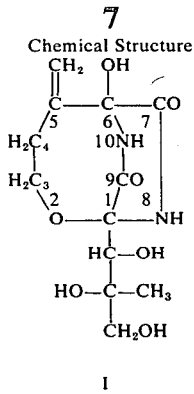

I

Chemical Name:

1-(1,2,3-trihydroxy-2-methyl)propyl-5-methylene-6-hydroxy-7,9-dioxo-2-oxa-8,10-diazabicyclo[4,2,2]decan.

The antibiotic WS-4545, produced by methods of this invention, has been found to possess a specific antibiotic spectrum, showing extremely useful activity against gram negative bacteria, including Escherichia, Salmonella and Shigella species. Further, it is noted that this antibiotic is adminstered by injection, introduced into serum in relatively high level and excreted in urine in high concentration. Accordingly, this antibiotic may be useful in treatment of infectious diseases caused by such bacteria in human and animals, especially by way of injection administration. The antibacterial, serum level and urinary excretion tests are described as follows.

Minimum Inhibitory Concentration (M.I.C.):

M.I.C. test was conducted by the usual serial agar dilution method, using a heart infusion agar for bacteria, a glucose-bouillon medium for Mycobacterium and a malt extract medium for fungus and yeast, which are incubated at 30°C for 24 – 72 hours. M.I.C. value is expressed as the minimum concentration of WS-4545 (mcg/ml) which inhibited growth of the microorganisms. The results are as follows.

| Test Microorganism | M.I.C. (mcg/ml) |
|---|---|
| Escherichia coli | 25 – 50 |
| Salmonella typhosa | 25 – 50 |
| Shigella flexneri | 12.5 – 25 |
| Staphylococcus aureus | >200 |
| Bacillus subtilis | >200 |
| Sarcina lutea | >200 |
| Proteus vulgaris | >200 |
| Mycobacterium phlei | >200 |
| Candida albicans | >200 |
| Penicillium chrysogenum | >200 |

Protecting Effect in Experimental Mice Infections:

The in vivo activity of WS-4545 against E.coli resistant to another antibiotics was investigated using ICR-strain, male mice, each weighing 27–30 g. Each experimental group consisted of 10 animals. The infecting microorganisms were cultured overnight in BHI-broth at 37°C. 0.5 ml of the culture was inoculated by the intraperitoneal route, and treatment was administered subcutaneously once at 1 hour after challenge. Infected, untreated control animals died within 48 hours under this condition. The experimental animals were observed for death or survival for 10 days, and the results were calculated in terms of median effect doses ($ED_{50}$). The results are as follows:

| Strain | Antibiotic | $ED_{50}$ (mg/mouse) |
|---|---|---|
| E.coli 312 | WS-4545 | 3.05 |
|  | Chloramphenicol | >28 |
| E.coli 320 | WS-4545 | 0.87 |
|  | Streptomycin | 17.09 |
| E.coli 323 | WS-4545 | 4.05 |
|  | Kanamycin | >28 |
| E.coli 324 | WS-4545 | 0.69 |
|  | Tetracycline | >28 |
| E.coli 335 | WS-4545 | 0.88 |
|  | Nalidixic acid | 0.54 |

Serum Levels and Urinary Excretion in Healthy Volunteers after Intramuscular Administration:

The serum and urinary levels were determined in 5 healthy volunteers. Five adult male volunteers, ranging from 60.0 to 75.0 kg in weight, were each administered intramuscularly WS-4545 at a single dose of 1,000 mg and 500 mg. Blood specimens were obtained at 0.5, 1, 2, 3 and 5 hours after administration. Urine samples were collected over the periods 0 – 1, 1 – 3, 3 – 6, 6 – 8, 8 – 10 and 10 – 24 hours following the administration. The concentrations of WS-4545 in the serum and urine were assayed by cup method. The results are as follows.

| Urine (mcg/ml) | 0-1hr | 1-3hr | 3-6hr | 6-8hr | 8-10hr | 10-24hr | Total (%) |
|---|---|---|---|---|---|---|---|
| 500 mg | 620 (18%) | 1256 (38%) | 459 (22%) | 221 (8%) | 97 (4%) | 54 (5%) | 94.0 |
| 1000 mg | 1501 (17%) | 2266 (38%) | 1256 (20%) | 726 (11%) | 393 (4%) | 73 (5%) | 94.8 |

| Serum (mcg/ml) | ½ | 1 hr | 2 hr | 3 hr | 5 hr |
|---|---|---|---|---|---|
| 500 mg | 14.7 | 13.7 | 15.6 | <15.0 | <15.0 |
| 1000 mg | 31.1 | 31.9 | 21.6 | 18.8 | 15.0 |

Another and extremely important property of WS-4545 is that it appears to have extremely low toxicity as follows.

| | Acute toxicity (Single administration) $LD_{50}$ (mg/kg)* | | | |
|---|---|---|---|---|
| Species | Sex | i.v. | i.p. | s.c. | p.o. |
| Mouse | Male | >2000 | >4000 | >4000 | >4000 |
|  | Female | >2000 | >4000 | >4000 | >4000 |
| Rat | Male | >2000 | >4000 | >4000 | >4000 |
|  | Female | >2000 | >4000 | >4000 | >4000 |

*The animals were observed for 7 days after administration.

IMPROVED ACYL DERIVATIVES OF THE ANTIBIOTIC WS-4545

We have also found that the hydroxy group of the antibiotic WS-4545 can be easily acylated with an acylating agent to give the corresponding acyl derivatives thereof. In other words, the antibiotic WS-4545 is reacted with a carboxylic acid or the reactive derivative thereof to provide an ester of said carboxylic acid with the WS-4545.

Accordingly, the acyl derivatives of the antibiotic WS-4545 may be prepared by acylating the antibiotic WS-4545 with an acylating agents.

The acylating agents to be used in this invention are a carboxylic acids of the general formula R-OH(II) wherein R is a carboxylic acyl group, and reactive derivatives thereof, including aliphatic carboxylic acids, aromatic carboxylic acids, heterocyclic carboxylic acids and the reactive derivatives thereof.

More particularly, aliphatic carboxylic acid of general formula (II) wherein R is a saturated or unsaturated aliphatic hydrocarbon carbonyl such as, alkanoyl (e.g. acetyl, propionyl, butyryl, isobutyryl, valeryl, isovaleryl, pivaloyl, 2-ethylbutyryl, caproyl, palmitoyl, stearoyl, etc.) having 2 to 20 carbon atoms, and alkenoyl (e.g. acryloyl, meta-acryloyl, crotonoyl, oleoyl, linoleoyl, linolenoyl, etc.) having 2 to 20 carbon atoms or a saturated or unsaturated aliphatic cyclohydrocarbon carbonyl such as, cycloalkane carbonyl (e.g. cyclohexyl carbonyl) and cycloalkene carbonyl (e.g. cyclohexenyl carbonyl); or a aliphatic cyclohydrocarbon substituted aliphatic hydrocarbon carbonyl such as, cycloalkane alkanoyl (e.g. cyclohexylacetyl, cyclohexylpropropinoyl etc.) having 7 to 13 carbon atoms. Further, the aliphatic hydrocarbon moiety of said aliphatic carboxylic acid may be straight or branched and interrupted by a hetero atom, such as oxygen or sulfur. Such examples are methoxyacetyl, methylthioacetyl, butylthioacetyl, methoxycarbonyl, ethoxycarbonyl, cyclohexylthioacetyl, etc.

Aromatic carboxylic acids of general formula (II) wherein R is aryloyl (e.g. benzoyl, toluoyl, xyloyl, naphthoyl, etc.) or aryl substituted aliphatic hydrocarbon carbonyl such as aralkanoyl (e.g. phenylacetyl, phenylpropionyl, hydrotropoyl, etc.) and aralkenoyl (e.g. cinnamoyl, etc.). The aliphatic hydrocarbon moiety (i.e. alkane or alkene) having 1 to 6 carbon atoms of said aryl substituted aliphatic hydrocarbon carbonyl (i.e. aralkanoyl and aralkenoyl) may be interrupted by a hetero atom, such as oxygen and fulfur, and such examples are phenoxyacetyl, phenylthioacetyl, etc.

Heterocyclic carboxylic acids of general formula (II) wherein R is heterocyclic ring carbonyl, including monoheterocyclic and di-heterocyclic ring, or benzene-fused heterocyclic ring carbonyl, the said heterocyclic ring being 5 to 6 membered one and containing at least one hetero atom selected from nitrogen, oxygen and sulfur, such as nicotinoyl, isonicotinoyl, 2-furoyl, 2-thenoyl, benzofuroyl, benzothenoyl, etc.; or aliphatic hydrocarbon carbonyl (e.g. alkanoyl or alkenoyl) substituted by said heterocyclic ring or benzene-fused heterocyclic ring such as 1H (or 2H) tetrazolylacetyl, thienylacetyl, furylacetyl, 3-benzothiazolylacetyl, 2-oxo-3-benzothiazolylacetyl, 3-indolylacetyl, morpholinoacetyl, etc. and said aliphatic hydrocarbon moiety (i.e. alkane or alkene) may be interrupted by an hetero atom such as oxygen and sulfur and having 1 to 6 carbon atoms.

In the aforementioned aliphatic carboxylic acid, aromatic carboxylic acid and heterocyclic carboxylic acid, the aliphatic hydrocarbon moiety (i.e. alkene, alkane, cyc-oalkane and cycloalkene), the aromatic ring (i.e. aryl) and the heterocyclic ring may be substituted by one or more possible substituent such as halogen (e.g. chlorine, bromine, fluorine, etc.), alkoxy (e.g. methoxy, ethoxy, etc.), amino, acylamino (e.g. acetylamino), acyloxy (e.g. acetoxy) nitro, hydroxy, etc. Such examples are illustrated as follows:-

Chloroacetic acid, tri-chloroacetic acid, trichloropropionic acid, benzolyglycine, bromobenzoic acid, chlorobenzoic acid, nitrobenzoic acid, methoxybenzoic acid, 3,4-dimethoxybenzoic acid, 3,4-dimethylbenzoic acid, 3,4,5-trimethoxybenzoic acid, 3,4-dimethoxycinnamic acid, 4-chlorocinnamic acid, chlorophenylpropionic acid, chlorophenoxyacetic acid, 5-nitrofuran-2-carboxylic acid, 5-chlorobenzofuran-2-carboxylic acid, 5-chloro-2-oxo-3-benzothiazolyl acetic acid, etc.

Examples of the reactive derivative of the carboxylic acid (II) are acid halides (e.g. acid chloride, acid bromide, etc.), acid anhydrides (e.g. acid anhydride with alkyl sulfuric acid, alkylphosphoric acid, aliphatic or aromatic carboxylic acid, etc.), acid amides (e.g. acid amide with imidazole, acid amide with 4-substituted imidazole, etc.), acid esters (e.g. methyl ester, ethyl ester, cyanomethyl ester, p-nitrophenylester, etc.) and acid azide. In case of using the carboxylic acid as it is or in form of salt (e.g. sodium salt, potassium salt, etc.), it may be preferable to employ a condensing agent in the reaction. Examples of the condensing agent are N,N'-dicyclohexylcarbodiimide, polyphosphoric acid, ethyl polyphosphate, isopropylphosphate, etc.

The reaction is usually conducted in an inert solvent such as water, acetone, dioxane, acetontrile, pyridine, chloroform, ethyl acetate, tetrahydrofuran, ethylene dichloride, dimethylsulfoxide, dimethylformamide, dimethylacetamide, etc. If necessary, a basic substance (e.g. alkali-metal carbonate, alkali-metal hydrogen carbonate, trialkylamine, pyridine, etc.) may be present in the reaction. The reaction temperature is not especially limited, but the reaction is usually carried out under cooling or at room temperature. The acylated compound can be isolated and purified by a conventional method.

In the acylation reaction of this invention, it is to be understood that there may be produced mono-acyl derivative, di-acyl derivative or tri-acyl derivative of the antibiotic WS-4545 or their mixture according to an amount of an acylating agent to be used in the reaction.

That is, the WS-4545 is acylated with an acylating agent in an amount of one molar equivalent to said starting material to provide mainly monoacyl derivative thereof. Acylation of WS-4545 using nearly two molar equivalents of an acylating agent produces mainly di-acyl derivative thereof. When the WS-4545 is treated with more than three molar equivalents of an acylating agent, tri-acyl derivative thereof is mainly produced. In case of the production of a mixture of mono-, di- and tri-acyl derivatives in the reaction, each of the acyl derivatives may be isolated from the reaction mixture by a conventional manner, for example, by means of chromatography or crystallization. Further, mono-acyl derivative may be acylated with at least one molar equivalent of an acylating agent which provides an acyl radial which may be the same as or different from that of the monoacyl derivative to give the di- or tri-acyl derivative, in which the acyl radials are the same as or one different from each other.

For convenience, an explanation of this reaction may be also made by using the chemical structure as follows.

The acylation reaction of this invention may be also show by the following reaction formula.

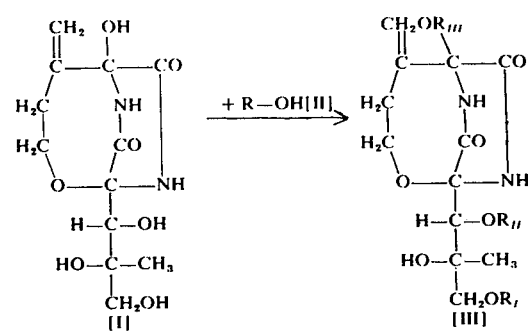

(wherein $R_I$ is an acyl group and $R_{II}$ and $R_{III}$ are hydrogen or an acyl group)

In the above formula, mono-acyl derivative of the antibiotic WS-4545 may be the compound (III) wherein $R_I$ is an acyl group and $R_{II}$ and $R_{III}$ are hydrogen; a di-acyl one may be the compound (III) wherein $R_I$ and $R_{II}$ are an acyl group and $R_{III}$ is hydrogen; and a tri-acyl one is the compound (III) wherein $R_I$, $R_{II}$ and $R_{III}$ are an acyl group.

Further, acyl derivatives of the antibiotic WS-4545 (i.e. carboxylic acid ester of the WS-4545) prepared in the following examples are summarised in the following table:

| Example No. | Compound of the formula (III) $R_I$ | $R_{II}$ | $R_{III}$ |
|---|---|---|---|
| 1 | acetyl | H | H |
| 2 | propionyl | H | H |
| 3 | palmitoyl | H | H |
| 4 | crotonoyl | H | H |
| 5 | cyclohexyl carbonyl | H | H |
| 6 | acetyl | acetyl | acetyl |
| 7(A) | butyryl | H | H |
| 7(B) | butyryl | butyryl | H |
| 8 | benzoyl | H | H |
| 9 | p-chloro-benzoyl | H | H |
| 10 | m-bromo-benzoyl | H | H |
| 11 | p-bromo-benzoyl | H | H |
| 12 | 3,4-dimethyl-benzoyl | H | H |
| 13 | p-acetoxy benzoyl | H | H |
| 14 | p-chloro-phenoxy-acetyl | H | H |
| 15 | cinnamoyl | H | H |
| 16 | β-phenyl-propionyl | H | H |
| 17(A) | benzoyl | benzoyl | benzoyl |
| 17(B) | benzoyl | benzoyl | H |
| 18 | nicotinoyl | H | H |
| 19 | 2-thenoyl | H | H |
| 20 | 5-chloro-2-oxo-3-benzo-thiazolinyl-acetyl | H | H |
| 21(A) | 2-furoyl | H | H |
| 21(B) | 2-furoyl | 2-furoyl | H |
| 22 | p-bromo-benzoyl | acetyl | acetyl |
| 23 | p-bromo-benzoyl | benzoyl | benzoyl |
| 24 | m-bromo-benzoyl | acetyl | acetyl |
| 25 | hexanoyl | H | H |
| 26 | heptanoyl | H | H |
| 27 | octanoyl | H | H |
| 28 | decanoyl | H | H |
| 29 | pivaloyl | H | H |
| 30 | 2-methyl-butyryl | H | H |
| 31 | methyl-thioacetyl | H | H |
| 32 | isopropyl-thio acetyl | H | H |
| 33 | 2-methylthio propionyl | H | H |
| 34 | 3-vinylpropionyl | H | H |
| 35 | 3-methylcrotonoyl | H | H |
| 36 | 2-(3,4,5-tri-methoxy)-phenylacetyl | H | H |
| 37 | 3,4,5-tri-methoxy benzoyl | H | H |
| 38 | phenylacetyl | H | H |
| 39 | p-nitro-benzoyl | H | H |
| 40 | phenoxy-acetyl | H | H |
| 41 | thienylacetyl | H | H |
| 42 | 3-methoxy-carbonyl propionyl | H | H |
| 43 | ethyl-thioacetyl | H | H |
| 44 | valeryl | H | H |
| 45 | tetrahydro-2-thenoyl | H | H |
| 46 | t-butyl-thioacetyl | H | H |
| 47 | 2-t-butylthio propionyl | H | H |

Thus prepared acyl derivative of the WS-4545 is absorbed by oral administration into a body in much higher concentration than that of the WS-4545 and may be transformed into the WS-4545, which is active against pathogenic bacteria. Accordingly, the acyl derivatives are useful as an antibiotic, which is effective by oral administration in treatment of infectious diseases in humans and animals. This is revealed by the following pharmacological tests.

Urinary Excretion after Oral Administration in Rats:

Serum Level and Urinary Excretion after Oral Administration of acyl derivatives of the WS-4545 in healthy volunteers:

The serum and urinary levels were determined in 3 healthy volunteers, Three adult male volunteers, ranging from 60.0 to 75.0 kg in weight, were each administered orally a sample at a single dose of 1,000 mg and 500 mg. Blood specimens were obtained at 1, 2, 3, 5 and 8 hours after administration. Urine samples were collected over the periods 0–1, 1–3, 3–6, 6–9 and 9–24 hours following the administration.

The concentrations of the WS-4545 in the serum and urine were assayed by cup method. The similar urinary excretion test was conducted on the antibiotic WS-4545. The results are shown as follows.

| Example No. | Acyl derivative Urine (mcg/ml) | 0 – 1 hr | 1 – 3 | 3 – 6 | 6 – 9 | 9 – 24 | Total (%) |
|---|---|---|---|---|---|---|---|
| 1 | Acetyl | 292 (5.2%) | (8%) | 540 (2.8%) | 141 (3.6%) | 64 19.6 | |
| 8 | Benzoyl | 608 (10.6%) | 1199 (30.3%) | 930 (20.0%) | 389 (8.5%) | 64 (4.7%) | 74.3 |
| 2 | Propionyl | 285 (2.8%) | 1380 (11.7%) | 1385 (14.3%) | 717 (7.3%) | 170 (7.7%) | 43.8 |
| 7(A) | Butyryl | 401 (5.9%) | 2770 (34.0%) | 1386 (19.1%) | 458 (5.3%) | 77 (5.4%) | 69.6 |
| 3 | Palmitoyl | 216 (2.3%) | 1353 (17.3%) | 1239 (21.8%) | 549 (10.2%) | 82 (5.8%) | 57.5 |

| Urine (mcg) | 0–2 hr | 2–4 | 4–6 | 6–8 | 8–10 | 10–24 | Total % |
|---|---|---|---|---|---|---|---|
| WS-4545 | 35.0 (0.6%) | 58.0 (0.8%) | 56.5 (1.1%) | 50.0 (0.5%) | 23.5 (0.4%) | 9.5 (0.3%) | 2.9 |

| Example No. | Acyl derivative of the WS-4545 | 0 – 3 hr mcg/ml | % | 3 – 6 hr mcg/ml | % | 6 – 24 hr mcg/ml | % | Total mg | % |
|---|---|---|---|---|---|---|---|---|---|
| 8 | Benzoyl | 7112 | 57.4 | 3569 | 13.1 | 718 | 12.7 | 15.31 | 80.5 |
| 15 | Cinnamoyl | 7520 | 34.5 | 8350 | 23.7 | 796 | 14.6 | 13.10 | 72.8 |
| 7(A) | Butyryl | 16660 | 61.4 | 9839 | 20.3 | 506 | 12.3 | 15.04 | 94.0 |
| 9 | p-chlorobenzoyl | 9273 | 78.2 | 6352 | 18.7 | 640 | 16.7 | 19.34 | 113.7 |
| 12 | 3,4-dimethyl-benzoyl | 3466 | 42.8 | 11947 | 36.8 | 962 | 19.0 | 15.76 | 98.5 |
| 3 | palmitoyl | 3331 | 33.4 | 15686 | 43.0 | 1400 | 28.2 | 16.72 | 104.5 |
| 5 | cyclohexyl-carbonyl | 16703 | 71.6 | 4358 | 19.5 | 411 | 9.3 | 17.67 | 100.3 |
| | Control (WS-4545) | 1057 | 8.5 | 1455 | 5.8 | 442 | 9.7 | 4.72 | 24.1 |

Note:
Animal ; SD-Rat, 170 – 200 g
Dose ; 100 mg/kg
Assay ; The concentration of the WS-4545 in the urine were assayed by cup method using Escherichia coli.

| Example No. | Acyl derivative Serum (mcg/ml) | 1 hr | 2 hr | 3 hr | 5 hr | 8 hr |
|---|---|---|---|---|---|---|
| 8 | Benzoyl | 25.2 | 25.8 | 20.1 | 14.0 | <14.0 |
| 7(A) | Butyryl | 16.9 | 20.7 | 15.7 | <10.0 | <10.0 |
| 3 | Palmitoyl | 12.4 | 16.6 | 15.1 | 11.9 | <10.0 |

For convenience and the clear embodiment of the antibiotic WS-4545 and its acyl derivatives, all the formula described above may be represented by the formula as follows.

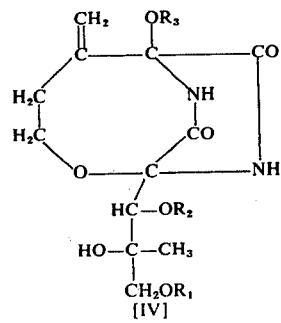

[IV]

wherein $R_1$, $R_2$ and $R_3$ are hydrogen or an acyl group.

The compounds according to this invention may be formulated for administration in any convenient way by analogy with other antibiotics substances.

Thus, the composition of this invention can be used in the form of pharmaceutical preparation, for example, in solid, semisolid or liquid form, which contain the active WS-4545 substance and/or its acylated derivative in admixture with a pharmaceutical organic or inorganic carrier or excipient suitable for external or parenteral applications. The active ingredient may be compounded, for example, with the usual carriers for tablets, peletts, capsules, suppositories, solutions, emulsions, aqueous suspensions and other form suitable for use. The carriers which can be used are glucose, lactose, gum acacia, gelatin, mannitol, starch paste, magnesium trisilicate, talc, corn starch, keratin, colloidal silica, potato starch, urea and other carrier suitable for use in manufacturing preparations, in solid, semisolid or liquid form, and in addition auxiliary, stabilizing, thickening and coloring agents and perfumes. The compositions of this invention can also contain preservative or bacteriostatic agents thereby keeping the active ingredient in the desired preparations stable inn activity. The active WS-4545 substance and/or its acylated derivative is included in the compositions of this invention in an amount sufficient to produce the desired therapeutic effect upon the bacterially infected process or condition. While the dosage or therapeutically effective quantity of the compound vary from and also depend upon the age and condition of each individual patient being treated, a daily dose of about 0.5 – 5 g., preferably 1 – 2g/day of the active ingredient is generally given for treating diseases against which the antibiotic or its derivatives are useful.

The following examples are given for the purpose of illustrating this invention.

Production of the Antibiotic WS-4545

EXAMPLE 1

500 ml. flasks, each of them containing 100 ml. of the following vegetative medium, were prepared,

| Starch | 2 % |
| Dried yeast | 1 % |
| Cottonseed meal | 1 % |
| Gluten meal | 1 % |
| Peanut meal | 1 % |
| $KH_2PO_4$ | 2.18 % |
| $Na_2HPO_4 \cdot 12H_2O$ | 1.43 % | in the tap water. Six flasks were used.

This medium was sterilized by heating at about 120°C for about 30 minutes in an autoclave and cooled. Each flask was inoculated with spores and mycelia of *Streptomyces sapporonensis* ATCC 21532 which were grown on an agar slant. The organism was grown in the medium at about 30°C for peroid of 48 hours on a shaker.

On the other hand, in a 30 l. stainless tank was placed 20 l. of a fermentation medium containing the same ingredient as mentioned above. The medium was sterilized by heating it at about 120°C for about 30 minutes under pressure. The cooled fermentation medium was inoculated under aseptic conditions with with the above-described vegetative inoculum culture in an amount of 3 % to volume of the medium and then the organism was grown at 30°C for 48 hours. During the growth period, the broth was stirred with a propeller operating at 300 r.p.m. and sterile air was passed through the broth at the rate of about 20 l. volume of air per minute.

After fermentation was completed, the culture broth was filtered to remove the mycelia, the filtration being assisted by adding one percent of "Radiolite" (trade name, a filter aid material sold by Showa Chemical company) to the broth. The filtrate was adjusted to pH 7.0 and 500 g of activated carbon was added to it. The mixture was stirred for 5 minutes and then the activated carbon cake was collected by filtration. 10 l. of water was added to this cake and the mixture was stirred and the activated carbon cake was collected by filtration. Then, the activated carbon cake containing effective antibiotic was subjected to extraction with 5 l. of 50 % aqueous acetone, stirring for 5 minutes. This extraction operation was conducted twice. The combined aqueous acetone layer was concentrated to give syrup-like substance.

Said substance was passed through a column packed with cellulose and elution was conducted with aqueous butanol. Successive fractions were collected for assay. The fractions showing antimicrobial activity were combined and concentrated to give a yellow and oily substance. The said oily substance was passed through a column packed with silicic acid. After the column was washed with chloroform, elution was carried out using a mixture of chloroform and methanol (5 : 1). Successive fractions were collected for assay. The fractions showing anti-microbial activity were combined and concentrated. The residue was freeze-dried to give 350 mg of white powder. The powder was dissolved in 20 ml of hot acetone. The acetone solution was kept in a refrigerator to give 300 mg of the antibiotic WS-4545 as crystals (Rhombic system).

EXAMPLE 2

To a broth culture obtained according to Example 1, one percent of Radiolite was added and the whole was filtered. 400 g of activated carbon was added to 14 l. of the filtrate which was adjusted to pH 7.0 and the mixture was stirred for 20 minutes. After the mixture was filtered the activated carbon cake was washed with 5 l. of water and then subjected to extraction with 3 l. of a mixture of ethyl acetate and methanol (5 : 1). Said extraction operation was carried out twice. The extracts were combined and concentrated under reduced pressure to an amount of about 50 ml. To the concentrate (syrup-like substance), was added 20 ml of acetone and the acetone solution was filtered to remove impurities. The filtrate was concentrated. The residue was dried, and then was passed through a column packed with silicagel filled up by chloroform, followed by passing chloroform through the column to remove impurities. Elution was carried out using acetone. Successive fractions were collected for assay. The fractions showing antimicrobial activity were combined and concentrated to give 1.25 g of white crystals. The crystals were powdered by addition of a small amount of methanol and then the powder was recrystallized from acetone to give 1.0 g of the antibiotic WS-4545 as white needles (monoclinic system).

EXAMPLE 3

Six 500 ml flasks, each of them containing 100 ml of the following vegetative medium, were prepared,

| Starch | 2 % |
| Cottonseed meal | 1 % |
| Gluten meal | 1 % |
| $MgCl_2 \cdot 6H_2O$ | 1 % |
| $KH_2PO_4$ | 2.18 % |
| $Na_2HPO_4 \cdot 12H_2O$ | 1.43 % | in the tap water.

This medium was sterilized by a conventional method and each flask was inoculated with spore and mycelia of Streptomyces sapporonensis ATCC-21532. The organism was grown in the medium at about 30°C for period of 48 hours on a shaker.

In a 30 l. stainless tank was placed 20 l. of a fermentation medium containing the same ingredient as mentioned above. The culture medium was sterilized by heating it under pressure at about 120°C for about 30 minutes and cooled. The medium was inoculated aseptically with the above described vegetative inoculum culture in an amount of 3 % pr volume of the medium and then the organism was grown 30°C for 48 hours. During the growth period, the broth was stirred with a propeller operating at 300 r.p.m. and sterile air was passed through the broth at a rate of about 20 l. of sterile air per minute.

After fermentation was completed, the culture broth was filtered to remove the mycelia, the filtration being assisted by use of 1 percent of "Radiolite". To the filtrate, about 200 g. of activated carbon was added and the mixture was stirred for 10 minutes. After the mixture was filtered, 10 l. of water was added to the activated carbon cake, and the mixture was stirred and then filtered. A mixture of 4 l. of ethyl acetate and 2 l. of ethanol was added to the collected activated carbon cake, and the mixture was stirred for 10 minutes and then filtered to give a filtrate and the activated carbon cake. This cake was further treated with a mixture of 2 l. of ethyl acetate and 1 l. of methanol in the same manner to give a filtrate. Both filtrates were combined and concentrated to give a syruplike substance. To the syrup, was added 100 g of Radiolite and the mixture was dried under reduced pressure at 30°C. The dried substance was subjected to extraction with a mixture of 300 ml of acetone and 100 ml of methanol. This extration operation was carried out twice. Thus obtained extract was combined and concentrated to give a yellow oily residue. This oily substance was passed through a column packed with silicic acid, followed by passing chloroform through it to remove impurities. Elution was conducted with a mixture of chloroform and methanol (5 : 1). The fractions showing antimicrobial activity were collected and concentrated. The concentrate was allowed to stand to give 900 mg of white prism crystals. Said crystals were recrystallised from a mixture of methanol and acetone to give 800 mg of the antibiotic WS-4545 as crystal, which was identified with the WS-4545 produced in Example 1.

Preparation of Acyl Derivatives of the antibiotic WS-4545

The above antibiotic WS-4545 is also used for preparing the acyl derivatives as a starting material as referred hereinafter WS-4545 substance.

EXAMPLE 1

To a solution of WS-4545 substance (100 mg) in pyridine (0.5 ml), there was added dropwise acetic anhydride (0.5 ml) under cooling at −10°C and the mixture was stirred for 3 hours. To the reaction mixture, there was added an ice-water and the solution was subjected to lyophilization. The lyophilized substance was crystallized from a mixture of acetone and ether to provide crystals which were recrystallized from acetone to give 50 mg of acetic acid ester of WS-4545 substance as prisms melting at 213° − 215°C. Analysis for $C_{14}H_{20}O_8N_2$

|  | C | H | N |
|---|---|---|---|
| Calculated : | 48.83 | 5.86 | 8.14 |
| Found : | 48.91 | 5.81 | 8.08 |

EXAMPLE 2

To a solution of WS-4545 substance (12.08 g) in pyridine (48 ml), there was added dropwise propionic anhydride (7.8 g) with stirring under cooling at −5 to −10°C, while it took 1.5 hours. To the reaction mixture, after allowed to stand overnight, water (100 ml) was added and the solution was concentrated under reduced pressure.

The residue was dissolved in water (100 ml), and the solution was washed with ethyl acetate and then concentrated under reduced pressure. The residue was recrystallized from ethyl acetate to give 4.6 g of propionic acid ester of WS-4545 substance as colorless crystals melting at 178 − 179°C.

Analysis for $C_{15}H_{22}N_2O_8$

|  | C | H | N |
|---|---|---|---|
| Calculated : | 50.27 | 6.19 | 7.82 |
| Found : | 50.18 | 6.25 | 7.51 |

EXAMPLE 3

To a solution of WS-4545 substance (6.04 g) in pyridine (30 ml), there was added dropwise palmitoyl chloride (5.81 g) with stirring under cooling in icewater bath, while it took one hour. The mixture was stirred at the same temperature for one hour and further at room temperature for one hour. To the reaction mixture, cool water (60 ml) was added and the solution was concentrated under reduced pressure. The residue was dissolved in ethyl acetate, and the solution was washed with water, 2.5 % hydrochloric acid, aqueous sodium bicarbonate solution and water respectively in turn and then dried over magnesium sulfate. The solvent was distilled off and the residue was recrystallized twice from a mixture of acetonitrile and isopropyl ether to provide 5.0 g of palmitic acid ester of WS-4545 substance as colorless crystals melting at 156° − 157°C.

Analysis for $C_{28}H_{48}N_2O_8$

|  | C | H | N |
|---|---|---|---|
| Calculated: | 62.20 | 8.95 | 5.18 |
| Found: | 62.14 | 9.17 | 5.05 |

In substantially the same manner as described in the above examples, there were obtained the acyl derivatives (i.e. carboxylic acid ester) of WS-4545 substance as illustrated in the following Example 4 to 5.

EXAMPLE 4

Starting material
WS-4545 substance; 3.02 g
Crotonic anhydride; 1.70 g
Solvent for recrystallization
Mixture of acetonitrile and isopropyl ether
Acyl derivative
Crotonic acid ester of WS-4545 Substance, colorless needles, yield; 1.0 g M.P.; 148° − 150°C,
Analysis for $C_{16}H_{22}N_2O_8$

|  | C | H | N |
|---|---|---|---|
| Calculated: | 51.88 | 5.99 | 7.56 |
| Found: | 51.92 | 6.09 | 7.40 |

EXAMPLE 5

Starting material
WS-4545 substance; 3.0 g
Cyclohexanecarbonyl chloride; 1.6 g
Solvent for recrystallization
Ethyl acetate
Acyl derivative
Cyclohexanecarboxylic acid ester, colorless prisms, yield 1.5 g, M.P.; 183° − 185°C (decomposition),
Analysis for $C_{19}H_{28}N_2O_8$

|  | C | H | N |
|---|---|---|---|
| Calculated: | 55.33 | 6.84 | 6.79 |
| Found: | 55.07 | 6.86 | 6.60 |

EXAMPLE 6

To a solution of WS-4545 substance (500 mg) in pyridine (2 ml), there was added dropwise acetic anhydride (2 ml) at room temperature and mixture was stirred for 5 hours. Crystals were separated by placing the reaction mixture in ice-water. The crystals were collected by filtration and washed with water and then recrystallized from methanol to give 600 mg of triacetic acid ester of WS-4545 substance, as colorless prisms melting at 247° – 250°C. (decomposition).

Analysis for $C_{18}H_{24}O_{10}N_2$

|  | C | H | N |
|---|---|---|---|
| Calculated: | 50.46 | 5.65 | 6.54 |
| Found: | 50.42 | 5.55 | 6.73 |

EXAMPLE 7

A. To a solution of WS-4545 substance (30.2 g) in pyridine (90 ml) was added dropwise n-butyric anhydride (17.4 g) at room temperature under stirring, while it took one hour and the mixture was stirred for one hour. Water was added to the reaction mixture and the solution was concentrated under reduced pressure. The residue was dissolved in ethyl acetate and the solution was washed with aqueous sodium bicarbonate solution and then water, and dried over magnesium sulfate. The solvent was distilled off under reduced pressure and the residue was washed with isopropyl ether to give crude crystals. The crystals were recrystallized from a mixture of ethyl acetate and benzene to provide crystals which were washed with isopropyl ether and dried to give 24.3 g of n-butyric acid ester of WS-4545 substance, as colorless crystals melting at 139°– 140°C.

Analysis for $C_{16}H_{24}N_2O_8$

|  | C | H | N |
|---|---|---|---|
| Calculated: | 51.60 | 6.50 | 7.52 |
| Found: | 51.53 | 6.58 | 7.34 |

B. The mother liquor obtained in the above recrystallization operation was condensed under reduced pressure. The residue was chromatographed using a column packed with silicagel, wherein elution was conducted with a mixture of chloroform and methanol (15 : 1). The eluate was concentrated under reduced pressure and the residue was recrystallized from a mixture of ethyl acetate and benzene to give 2.0 g di-n-butyric acid ester of WS-4545 substance, as colorless crystals melting at 160.5° – 162.5°C.

Analysis for $C_{20}H_{30}N_2O_9$

|  | C | H | N |
|---|---|---|---|
| Calculated: | 54.29 | 6.83 | 6.33 |
| Found: | 54.10 | 6.84 | 6.16 |

EXAMPLE 8

To a solution of WS-4545 substance (12.08 g) in pyridine (36 ml), there was added dropwise benzoyl chloride (6.7 g) at room temperature with stirring, while it took 1 hour. The mixture was stirred furthermore for one hour and followed by addition of water. The solution was concentrated under reduced pressure and the residue was dissolved in ethyl acetate. The solution was washed with water, aqueous sodium bicarbonate solution and water respectively in turn, and dried over magnesium sulfate. The solvent was distilled off under reduced pressure and the residue was recrystallized from a mixture of ethyl acetate and ether to give 12.0 g of benzoic acid ester of WS-4545 substance, as colorless crystals melting at 135°C.

Analysis for $C_{19}H_{22}N_2O_8$

|  | C | H | N |
|---|---|---|---|
| Calculated: | 56.15 | 5.46 | 6.89 |
| Found: | 55.92 | 5.42 | 6.69 |

EXAMPLE 9

To a solution of WS-4545 substance (2.0 g) in pyridine (6 ml), there was added dropwise p-chlorobenzoyl chloride (1.4 g) under cooling in ice-water bath, while it took about 30 minutes. The mixture was allowed to stand at the same temperature for one hour, after which the bath was taken off and the reaction was continued for 3 hours. Ice-water (50 ml) was added to the reaction mixture and the solution was subjected to extraction with ethyl acetate.

The ethyl acetate layer was washed with water, 2 % aqueous sodium bicarbonate solution and water respectively in turn and dried over magnesium sulfate. The ethyl acetate was distilled off and the residue was recrystallized from ethyl acetate, this recrystallization operation being conducted twice, to give 0.9 g of p-chlorobenzoic acid ester of WS-4545 substance, as colorless crystals melting at 135° – 137°C. Analysis for $C_{19}H_{21}ClN_2O_8$

|  | C | H | N | Cl |
|---|---|---|---|---|
| Calculated: | 51.84 | 4.79 | 6.34 | 8.03 |
| Found: | 51.67 | 4.75 | 6.23 | 8.30 |

In substantially the same manner as described in the above Examples 8 and 9, there were obtained the acyl derivatives (i.e. carboxylic acid ester) of WS-4545 substance as illustrated in the following Examples 10 – 16.

EXAMPLE 10

Starting material
WS-4545 substance; 6.04 g
m-bromobenzoyl chloride; 4.8 g
Solvent for recrystallization
Ethyl acetate
Acyl derivative
m-bromobenzoic acid ester of WS-4545 substance, colorless needles, yield; 6.0 g, M.P.; 138°C,
Analysis for $C_{19}H_{21}N_2BrO_8$

|  | C | H | N |
|---|---|---|---|
| Calculated: | 47.02 | 4.36 | 5.77 |
| Found: | 46.96 | 4.35 | 6.04 |

EXAMPLE 11

Starting material
WS-4545 substance; 6.04 g
p-bromobenzoyl chloride; 4.8 g
Solvent for recrystallization
ethyl acetate
Acyl derivative
p-bromobenzoic acid ester of WS-4545 substance, colorless needless, yield; 6.8 g, M.P.; 144° – 145°C,
N.M.R: spectrum; $\tau$(ppm) = 1.96 – 2.33 (triplet)

EXAMPLE 12

Starting material
WS-4545 substance; 3.0 g
3,4-dimethylbenzoyl chloride; 1.85 g
Solvent for recrystallization
Ethyl acetate
Acyl derivative
3,4-dimethylbenzoic acid ester of WS-4545, colorless crystals, yield 1.8 g, M.P.; 128° – 130°C,
Analysis for $C_{21}H_{26}N_2O_8$

|  | C | H | N |
|---|---|---|---|
| Calculated: | 58.06 | 6.03 | 6.45 |
| Found: | 58.30 | 6.26 | 6.32 |

EXAMPLE 13

Starting material
WS-4545 substance; 2.0 g
p-acetoxybenzoyl chloride; 1.6 g
Solvent for recrystallization
Mixture of ethyl acetate and benzene
Acyl derivative
p-acetoxybenzoic acid ester of WS-4545 substance, colorless crystals, yield; 0.5 g, M.P.; 130° – 132°C,
N.M.R. spectrum; τ(ppm)
7.68 (singlet 3H)
2.69 (doublet 2H)
1.94 (doublet 2H)
I.R. spectrum; 1760 cm$^{-1}$

EXAMPLE 14

Starting material
WS-4545 substance; 2.4 g
p-chlorophenoxyacetyl chloride; 2.6 g
Solvent for recrystallization
Ethyl acetate
Acyl derivative
p-chlorophenoxyacetic acid ester of WS-4545 substance, colorless silky needles, yield;
1.3 g, M.P.; 128° – 131°C.
Analysis for $C_{20}H_{23}ClN_2O_9$

|  | C | H | N | Cl |
|---|---|---|---|---|
| Calculated: | 51.02 | 4.92 | 5.95 | 7.53 |
| Found: | 50.78 | 4.88 | 5.97 | 7.60 |

EXAMPLE 15

Starting material
WS-4545 substance; 3.0 g
Cinnamoyl chloride; 1.9 g
Solvent for recrystallization
Mixture of chloroform and ether (1 : 1
Acyl derivative
Cinnamic acid ester of WS-4545 substance, colorless prisms, yield; 1.5 g, M.P.; 150°C. (decomposition),
Analysis for $C_{21}H_{24}N_2O_8$

|  | C | H | N |
|---|---|---|---|
| Calculated: | 58.33 | 5.59 | 6.48 |
| Found: | 58.16 | 5.62 | 6.20 |

EXAMPLE 16

Starting material
WS-4545 substance; 3.0 g
β-phenylpropionyl chloride; 1.7 g
Solvent for recrystallization
Acetonitrile
Acyl derivative
β-phenylpropionic acid ester of WS-4545 substance, colorless needles, yield; 1.6 g, M.P.; 153°C, (decomposition),
Analysis for $C_{21}H_{26}N_2O_8$

|  | C | H | N |
|---|---|---|---|
| Calculated: | 58.06 | 6.03 | 6.45 |
| Found: | 57.95 | 6.18 | 6.31 |

EXAMPLE 17

A. To a solution of WS-4545 substance (6.04 g) in pyridine (18 ml), there was added dropwise benzoyl chloride (7.0 g) at room temperature with stirring, while it took 1 hour. The mixture was stirred furthermore for 1 hour and allowed to stand overnight. Water was added to the reaction mixture and the solvent was distilled off under reduced pressure. The residue was dissolved in ethyl acetate. The solution was washed with water, aqueous sodium bicarbonate solution and water respectively in turn and dried over magnesium sulfate. The solvent was distilled off under reduced pressure and the residue was absorbed on silica gel in a column. The desired compound which was adsorbed on the silica gel in the column was eluted with a mixture of chloroform and ethyl acetate (9 : 1). The eluate was concentrated under reduced pressure and the residue was recrystallized from benzene to give 1.02 g of tri-benzoic acid ester of WS-4545 substance, colorless crystals melting at 165°C.

Analysis for $C_{33}H_{30}N_2O_{10}$

|  | C | H | N |
|---|---|---|---|
| Calculated: | 64.49 | 4.92 | 4.56 |
| Found: | 64.19 | 4.88 | 4.36 |

B. After the tri-benzoic acid ester of WS-4545 was eluted as mentioned above, the silica gel column was further eluted with a mixture of chloroform and methanol (19:1). The eluate was concentrated and the residue was recrystallized from chloroform to give 2.01 g of di-benzoic acid ester of WS-4545 substance, as colorless crystals melting at 209°C.

Analysis for $C_{26}H_{26}N_2O_9$

|  | C | H | N |
|---|---|---|---|
| Calculated: | 61.17 | 5.13 | 5.49 |
| Found: | 61.30 | 5.12 | 5.45 |

EXAMPLE 18

To a solution of WS-4545 substance (2.0 g) in pyridine (12 ml), there was added nicotinic anhydride (0.8 g) under cooling in ice-water bath and the mixtue was stirred for 1.5 hours. Thereafter, the cooling bath was taken off and further the reaction mixture was stirred for 5 hours. Water was added to the reaction mixture and the solution was concentrated under reduced pressure. The residue was subjected to extraction with ethyl acetate and the ethyl acetate layer was washed with aqueous sodium bicarbonate solution and dried over magnesium sulfate. The ethyl acetate was distilled off and the residue was recrystallized from ethyl acetate to provide 0.8 g of nicotinic acid ester of WS-4545 substance, as faint yellow crystals melting at 143°C.
Analysis for $C_{18}H_{21}O_8N_3$

|  | C | H | N |
|---|---|---|---|
| Calculated: | 53.07 | 5.20 | 10.32 |
| Found: | 52.79 | 5.33 | 10.09 |

In substantially the same manner as described in the above Example 18, there were obtained the acyl derivatives (i.e. carboxylic acid ester) of WS-4545 substance as illustrated in the following Examples 19 and 20.

EXAMPLE 19

Starting material
WS-4545 substance; 3.02 g
2-thenoyl chloride; 1.57 g
Solvent for recrystallization
Mixture of ethyl acetate and benzene
Acyl derivative
2-thiophencarboxylic acid ester of crystals, yield; 2.27 g. M.P.; 125°C.
Analysis for $C_{17}H_{20}N_2SO_8$

|  | C | H | N |
|---|---|---|---|
| Calculated: | 49.51 | 4.89 | 6.79 |
| Found: | 49.45 | 4.70 | 6.57 |

EXAMPLE 20

Starting material
WS-4545 substance; 1.0 g
5-chloro-2-benzothiazolinone-3-acetyl chloride; 0.75 g
Solvent for recrystallization
Mixture of acetonitrile and ethyl acetate
Acyl derivative
5-chloro-2-benzothiazolinone-3-acetic acid ester of WS-4545 substance, colorless plates, yield; 0.7 g, M.P.; 159°– 160°C. (decomposition),
Analysis; $C_{21}H_{22}O_9N_3SCl$

|  | C | H | N | S | Cl |
|---|---|---|---|---|---|
| Calculated: | 47.77 | 4.20 | 7.96 | 6.07 | 6.72 |
| Found: | 47.84 | 4.34 | 8.04 | 6.33 | 6.79 |

EXAMPLE 21

A. To a solution of WS-4545 substance (3.02 g) in pyridine (18 ml), there was added dropwise 2-furoyl chloride (1.43 g) under cooling at −5° to −10°C with stirring, while it took 30 minutes. The mixture was stirred at the same temperature for 2 hours and followed by addition of water (40 ml). The solvent was distilled off under reduced pressure and the residue was disolved in water. The solution was washed with ethyl acetate and then saturated with sodium chloride. The solution was subjected to the extraction with ethyl acetate, and the ethyl acetate layer was washed with aqueous sodium bicarbonate solution and dried over magnesium sulfate. The solvent was distilled off under reduced pressure and the residue was recrystallized from a mixture of ethyl acetate and benzene to give 0.93 g of 2-furoic acid ester of WS-4545substance, as colorless crystals melting at 125°C.
Analysis for $C_{17}H_{20}N_2O_9$

|  | C | H | N |
|---|---|---|---|
| Calculated: | 51.51 | 5.09 | 7.07 |
| Found: | 51.32 | 5.03 | 7.11 |

B. The mother liquid obtained in the above recrstallization operation was concentrated under reduced pressure and the residue was adsorbed on silica gel in a column and elution was conducted with a mixture of chloroform and methanol (15 : 1). The eluate was concentrated under reduced pressure and the residue was recrystallized from a mixture of chloroform and methanol to give 0.6 g of di-2-furoic acid ester of WS-4545 substance, colorless crystals melting at 183° – 184°C.
Analysis for $C_{22}H_{22}N_2O_{11}$

|  | C | H | N |
|---|---|---|---|
| Calculated: | 53.88 | 4.52 | 5.71 |
| Found: | 53.66 | 4.33 | 5.53 |

EXAMPLE 22

To a solution of p-bromobenzoic acid ester of WS-4545 substance (1.0 g), which was obtained in Example 11, in pyridine (3 ml), there was added dropwise acetic anhydride (3.0 ml) at room temperature with stirring, while it took 20 minutes. The mixture was stirred furthermore at room temperature for 4 hours and followed by addition of water. The solution was concentrated under reduced pressure and the residue was dissolved in water. The solution was washed with water, aqueous sodium bicarbonate solution and water respectively in turn, and dried over magnesium sulfate. The solvent was distilled off under reduced pressure and the residue was adsorbed on silica gel in a column and elution was conducted with a mixture of chloroform and ethyl acetate (8:2). The eluate was concentrated under reduced pressure to give crude crystals. They were recrystallized from a mixture of ethyl acetate and benzene to give 0.5 g of di-acetyl-p-bromobenzoyl derivative of WS-4545 substance, as colorless crystals melting at 210°C.
Analysis for $C_{23}H_{25}N_2BrO_{10}$

|  | C | H | N |
|---|---|---|---|
| Calculated: | 48.52 | 4.43 | 4.92 |
| Found: | 48.56 | 4.78 | 4.47 |

EXAMPLE 23

To a solution of p-bromobenzoic acid ester of WS-4545 substance (2.0 g) in pyridine (6 ml), there was added dropwise benzoyl chloride (1.45 g) at room temperature with stirring, while it took 30 minutes. The mixture was stirred furthermore at room temperature for 5 hours and allowed to stand overnight. Water was added to the reaction mixture and concentrated under reduced pressure. The residue was dissolved in ethyl acetate and washed with water, aqueous sodium bicarbonate solution and water. After drying the solution, the solvent was distilled off under reduced pressure. The residue was adsorbed on silica gel in a column and eluation was conducted with chloroform and the eluate was concentrated under reduced pressure to give crude crystals. This was recrystallized from ethyl acetate to give 1.51 g of di-benzoyl-p-bromobenzoyl derivative of WS-4545 substance, as needles melting at 177°– 178°C.

EXAMPLE 24

To a solution of m-bromobenzoic acid ester of WS-4545 substance (2.0 g), which was obtained in Example 10, in pyridine (6 ml), there was added dropwise acetic anhydride (40 ml) under cooling with stirring, while it took 30 minutes. The mixture was stirred furthermore for 3 hours and allowed to stand in a refrigerator overnight. Water was added to the reaction mixture and the solution was concentrated under reduced pressure. The residue was washed with water and dried to give crude crystals (2.2 g). They were recrystallized from acetone to give di-acetyl-m-bromobenzoyl derivative of WS-4545 substance, as crystals melting at 217°–218°C.

EXAMPLE 25

To a solution of WS-4545 substance (3.02 g) in a mixture of pyridine and acetone (9:3) (12 ml) were added dropwise a solution of hexanoyl chloride (3.02 g) in acetone (3 ml), with stirring and cooling in at 0° to 5°C, a ice-water bath, over the course of 1 hour. The reaction mixture was stirred at the same temperature for one hour. Three volumes of cold water were added to the reaction mixture and then the solution was concentrated under reduced pressure.

The residue was dissolved in ethyl acetate and the solution was successively washed with water, aqueous sodium bicarbonate solution and water and then dried over magnesium sulfate. The solution was concentrated under reduced pressure and the residue was crystallized from a mixture of benzene and n-hexan to give crude crystals (2.3 g). The crude crystals were recrystallized from acetonitril to give 1.8 g of hexanoic acid ester of WS-4545 substance in the form of colorless crystals melting at 144°–145°C.

Analysis for $C_{18}H_{28}N_2O_8$

|  | C | H | N |
|---|---|---|---|
| Calculated: | 54.00 | 7.04 | 6.99 |
| Found: | 54.11 | 7.18 | 7.00 |

In substantially the same manner as described in the above examples, there were obtained the acyl derivatives of WS-4545 substance as illustrated in the following Examples 25 to 32.

EXAMPLE 26

Starting material:
WS-4545 substance: 12.08 g
Heptanoyl chloride: 5.92 g
Solvent for recrystallization:
Acetonitril
Acyl derivative:
Heptanoic acid ester of WS-4545 substance, colorless crystals, yield: 5.5 g., M.P.: 139°–141°C.
Analysis for $C_{19}H_{30}N_2O_8$

|  | C | H | N |
|---|---|---|---|
| Calculated: | 55.05 | 7.30 | 6.76 |
| Found: | 54.60 | 7.42 | 6.86 |

EXAMPLE 27

Starting materials:
WS-4545 substance: 9.06 g
Octanoyl chloride: 4.88 g
Solvent for recrystallization:
Acetonitril
Acyl derivative:
Octanoic acid ester of WS-4545 substance, colorless crystals, yield: 5.15 g., M.P.: 140°–142°C.
Analysis for $C_{20}H_{32}N_2O_8$

|  | C | H | N |
|---|---|---|---|
| Calculated: | 56.07 | 7.52 | 6.54 |
| Found: | 55.77 | 7.69 | 6.53 |

EXAMPLE 28

Starting materials:
WS-4545 substance: 9.06 g
Decanoyl chloride: 5.7 g
Solvent for recrystallization:
Acetonitril
Acyl derivative:
Decanoic acid ester of WS-4545 substance, colorless crystals, yield: 6.0 g., M.P.: 146°–147°C.
Analysis for $C_{22}H_{36}N_2O_8$

|  | C | H | N |
|---|---|---|---|
| Calculated: | 57.88 | 7.95 | 6.14 |
| Found: | 57.79 | 8.07 | 6.24 |

EXAMPLE 29

Starting materials:
WS-4545 substance: 3.02 g
Pivaloyl chloride: 1.32 g
Solvent for recrystallization:
Acetonitril
Acyl derivative:
Pivalic acid ester of WS-4545 substance, colorless crystals, yield: 1.5 g., M.P.: 200°–201°C (dec.)
Analysis for $C_{17}H_{26}N_2O_8$

|  | C | H | N |
|---|---|---|---|
| Calculated: | 52.83 | 6.78 | 7.25 |
| Found: | 52.54 | 6.92 | 7.19 |

EXAMPLE 30

Starting materials:
WS-4545 substance: 30.2 g
2-Methylbutyryl chloride: 14.8 g
Solvent for recrystallization:
Benzene
Acyl derivative:
2-Methylbutyric acid ester of WS-4545 substance, colorless crystals, yield: 5.4 g, M.P.: 157°–159°C (dec.)
Analysis for $C_{17}H_{26}O_8N_2$

|  | C | H | N |
|---|---|---|---|
| Calculated: | 52.84 | 6.78 | 7.25 |
| Found: | 52.64 | 6.90 | 7.14 |

EXAMPLE 31

Starting materials:
WS-4545 substance: 3.02 g
Methylthio acetic anhydride: 2.23 g
Solvent for recrystallization:
Mixture of benzene and ethyl acetate
Acyl derivative:

Methylthio acetic acid ester of WS-4545 substance, colorless needles, yield: 2.15 g, M.P.: 79°–84°C,
Analysis for $C_{15}H_{23}O_8N_2S$

|  | C | H | N | S |
|---|---|---|---|---|
| Calculated: | 46.15 | 5.68 | 7.18 | 8.21 |
| Found: | 46.32 | 5.90 | 7.26 | 8.20 |

EXAMPLE 32

Starting materials:
WS-4545 substance: 27.2 g
Isopropylthio acetic anhydride: 22.5 g
Solvent for recrystallization:
Mixture of ethyl acetate and isopropyl ether
Acyl derivative:
Isopropylthio acetic acid ester of WS-4545 substance, colorless prisms, yield: 16.6 g, M.P.: 89°–92°C,
Analysis for $C_{17}H_{26}O_8N_2S$

|  | C | H | N |
|---|---|---|---|
| Calculated: | 48.80 | 6.26 | 6.70 |
| Found: | 48.38 | 6.15 | 6.48 |

EXAMPLE 33

Starting materials:
WS-4545 substance: 30.2 g
2-Methylthiopropionyl chloride: 15.3 g
Solvent for recrystallization:
Benzene
Acyl derivative:
2-Methylthiopropionic acid ester of WS-4545 substance, colorless crystals, yield: 13.7 g, M.P.: 90°–95°C,
Analysis for $C_{16}H_{24}O_8N_2S \cdot 1/6\ H_2O$

|  | C | H | N | S |
|---|---|---|---|---|
| Calculated: | 47.17 | 6.02 | 6.88 | 7.87 |
| Found: | 46.97 | 6.05 | 6.65 | 8.02 |

EXAMPLE 34

To a solution of WS-4545 substance (10.9 g) in pyridine (60 ml) were added dropwise 3-vinylpropionic anhydride (6.6 g) at 3°C, with stirring, over the course of 25 minutes.

The reaction mixture was stirred at 3°C for 30 minutes and at 3°–17°C for 14 hours. After the reaction was completed, pyridine was removed from the reaction mixture under reduced pressure. To the residue was added ice water and then the solution was washed with ether. The solution was saturated with sodium chloride and then extracted with ethyl acetate. The ethyl acetate layer was washed with sodium chloride saturated aqueous solution and then dried over magnesium sulfate to give amorphous powder (9.0 g).

The amorphous powder was dissolved in benzene. The benzene solution was left overnight to give crude crystals (7.1 g). The crude crystals were recrystallized from a mixture of ethyl acetate and diisopropyl ether to give 6.1 g of 3-vinylpropionic acid ester of WS-4545 substance as colorless crystals melting at 170°–172°C.
Analysis for $C_{17}H_{24}N_2O_8$

|  | C | H | N |
|---|---|---|---|
| Calculated: | 53.12 | 6.29 | 7.29 |
| Found: | 53.14 | 6.41 | 7.18 |

EXAMPLE 35

Starting materials:
WS-4545 substance: 30.2 g 3-Methylcrotonic anhydride: 20.0 g
Solvent for recrystallization:
Mixture of isopropyl ether and ethyl acetate
Acyl derivative:
3-Methylcrotonic acid ester of WS-4545 substance, colorless crystals, yield: 5.9 g, M.P.: 132°–135°C,
Analysis for $C_{17}H_{28}N_2O_8 \cdot 1/6\ H_2O$

|  | C | H | N |
|---|---|---|---|
| Calculated: | 52.71 | 6.33 | 7.23 |
| Found: | 52.61 | 6.31 | 7.00 |

EXAMPLE 36

To a solution of WS-4545 substance (9.7 g) in pyridine (30 ml) were added dropwise 16.76 g of 2-(3,4,5-trimethoxy)-phenylacetic anhydride during 30 minutes at 5°C., while stirring. The reaction mixture was stirred further overnight. To the reaction mixture was added three times volume of water and then concentrated. The residue was dissolved in ethyl acetate. To the ethyl acetate solution was added sodium bicarbonate saturated aqueous solution at below 5°C. and then vigorously stirred. To the sodium bicarbonate saturated aqueous solution were added small amount of sodium chloride and then stirred. The ethyl acetate layer was washed with water and then dried over magnesium sulfate to give yellow crude powder. The powder was triturated with ethyl acetate to give 4.83 g of 2-(3,4,5-trimethoxy)phenylacetic acid ester of WS-4545 substance as colorless crystals melting at 147°–150°C.
Analysis for $C_{23}H_{30}N_2O_{11}$

|  | C | H | N |
|---|---|---|---|
| Calculated: | 54.11 | 5.92 | 5.49 |
| Found | 53.82 | 5.91 | 5.20 |

EXAMPLE 37

Starting materials:
WS-4545 substance: 20 g
3,4,5-trimethoxybenzoyl chloride: 18.59 g
Solvent for recrystallization:
Ethyl acetate
Acyl derivative:
3,4,5-trimethoxybenzoic acid ester of WS-4545 substance, colorless prisms, yield: 22.64 g, M.P.: 161°–162°C.
Analysis for $C_{22}H_{28}N_2O_{11} \cdot 1/3\ H_2O$

|  | C | H | N |
|---|---|---|---|
| Calculated: | 52.63 | 5.74 | 5.58 |
| Found: | 52.48 | 5.63 | 5.67 |

EXAMPLE 38

Starting materials:
WS-4545 substance: 30.2 g
Phenylacetic anhydride: 27.9 g
Solvent for recrystallization:

Mixture of ethyl acetate and isopropylether
Acyl derivative:
Phenylacetic acid ester of WS-4545 substance, colorless crystals, yield: 6.6 g, M.P.: 96°–100°C (dec.)
Analysis for $C_{19}H_{24}N_2O_8 \cdot 2/3\ CH_3COOC_2H_5$

|  | C | H | N |
|---|---|---|---|
| Calculated: | 55.70 | 6.33 | 6.00 |
| Found: | 55.94 | 5.73 | 6.10 |

EXAMPLE 39

Starting materials:
WS-4545 substance: 30.2 g
p-Nitrobenzoic anhydride: 34.8 g
Solvent for recrystallization:
Mixture of ethyl acetate and ethylether
Acyl derivative:
p-Nitrobenzoic acid ester of WS-4545 substance, colorless crystals, yield: 28.5 g, M.P.: 135°–137°C
Analysis for $C_{19}H_{21}N_3O_{10}$

|  | C | H | N |
|---|---|---|---|
| Calculated: | 50.56 | 4.69 | 9.31 |
| Found: | 50.19 | 4.50 | 9.20 |

EXAMPLE 40

Starting material:
WS-4545 substance: 20.0 g
Phenoxyacetic anhydride: 20.8 g
Solvent for recrystallization:
Ethanol
Acyl derivative:
Phenoxyacetic acid ester of WS-4545 substance, colorless prisms, yield: 12.5 g, M.P.: 105°–109°C.
Analysis for $C_{20}H_{32}N_2O_9 \cdot 2/3\ C_2H_5OH$

|  | C | H | N |
|---|---|---|---|
| Calculated: | 54.85 | 6.04 | 6.00 |
| Found: | 54.86 | 6.11 | 5.96 |

EXAMPLE 41

To a solution of WS-4545 substance (20 g) in pyridine (150 ml), was added dropwise thienylacetic anhydride (19.43 g) under cooling and the mixture was stirred for 5 hours. To the reaction mixture was added water and the solution was concentrated under reduced pressure. The residue was dissolved in ethyl acetate and the solution was washed with water and aqueous sodium bicarbonate solution and water in turn and then dried over magnesium sulfate. The solvent was distilled off and the residue was treated with a activated carbon, after which the residue was recrystallized from a mixture of ethyl acetate and isopropyl ether to provide crystals which were recrystallized from the mixture of ethyl acetate and isopropyl ether to give 13.5 g of thienylacetic acid ester of WS-4545 substance as colorless prisms, melting at 171°–172°C.
Analysis for $C_{18}H_{22}O_8N_2S$

|  | C | H | N | S |
|---|---|---|---|---|
| Calculated: | 50.70 | 5.20 | 6.57 | 7.52 |
| Found: | 50.61 | 5.26 | 6.49 | 7.23 |

EXAMPLE 42

Starting materials:
WS-4545 substance: 12 g
3-Methoxycarbonylpropionyl chloride: 9.0 g
Acyl derivative:
3-Methoxycarbonylpropionic acid ester of WS-4545 substance, powder, yield: 1.5 g, M.P.: 200°–201°C (dec.)
The nuclear magnetic resonance spectrum:
Solvent: $D_2O$
Internal standard: DSS

| δ (ppm) | |
|---|---|
| 1.37 | (3H, singlet) |
| ca.2.50 | (2H, multiplet) |
| 2.70 | (4H, singlet) |
| 3.66 | (3H, singlet) |
| ca.3.5–3.9 | (2H, multiplet) |
| 4.05 | (1H, singlet) |
| ca.4.03(1H) | |
| 4.24 (1H) | (AB quartet J≈10Hz) |
| 5.20 | (1H, singlet) |
| 5.46 | (1H, singlet) |

EXAMPLE 43

To a solution of WS-4545 substance (24.2 g) in pyridine (70 ml) were added dropwise ethylthioacetic anhydride (19.7 g), with stirring and cooling at −5 to 0°C over the course of 1 hour. The reaction mixture was stirred at the same temperature for 1 hour and then allowed to stand overnight at ambient temperature. Three volumes of water were added to the reaction mixture and then the solution was concentrated at 50°C under reduced pressure to give an yellow oily residue. The residue was dissolved in ethyl acetate (200 ml) and the solution was washed several times with cold 10% hydrochloric acid aqueous solution until the aqueous layer was made acid in order to remove pyridine. The object compound was extracted twice with ethyl acetate (50 ml) from the salted-out aqueous layer. The combined extracts was washed twice with sodium bicarbonate saturated aqueous solution and the aqueous layer was treated by salting-out techniques and extraction with ethyl acetate. The ethyl acetate layer was washed three times with sodium chloride saturated aqueous solution, dried over magnesium sulfate and concentrated under reduced pressure to give crude powder (26 g). The powder was crystallized from a mixture of benzene:ethyl (1:1) (200 ml) to give colorless needles (24.76 g). The needles were recrystallized from ethyl acetate (200 ml) to give 9.95 g of ethylthioacetic acid ester of WS-4545 substance in the form of colorless needles decomposing at 142°–145°C.
Analysis for $C_{16}H_{24}O_8N_2S \cdot 1/4\ H_2O$

|  | C | H | N | S |
|---|---|---|---|---|
| Calculated: | 46.99 | 6.04 | 6.85 | 7.83 |
| Found: | 46.90 | 5.95 | 6.83 | 7.77 |

EXAMPLE 44

Starting materials:
WS-4545 substance: 36.5 g
Valeric anhydride: 33.5 g
Solvent for recrystallization:
Ethyl acetate
Acyl derivative:

Valeric acid ester of WS-4545 substance, colorless needles, yield: 11.8 g., M.P.: 146°–148°C. (dec.)
Analysis for $C_{17}H_{26}O_8N_2 \cdot 1/2\ H_2O$

|  | C | H | N |
|---|---|---|---|
| Calculated: | 51.67 | 6.76 | 7.09 |
| Found: | 51.82 | 6.71 | 7.15 |

EXAMPLE 45

Starting materials:
WS-4545 substance: 35 g
Tetrahydro-2-thenoyl chloride: 22.3 g
Solvent for recrystallization:
Ethyl acetate
Acyl derivative:
Tetrahydro-2-thenoic acid ester of WS-4545 substance, colorless needles, yield: 14.5 g., M.P.: 146°–148°C. (dec.)
Analysis for $C_{17}H_{24}O_8N_2S \cdot 78/100\ H_2O$

|  | C | H | N | S |
|---|---|---|---|---|
| Calculated: | 48.66 | 5.85 | 6.68 | 7.64 |
| Found: | 48.56 | 5.89 | 6.58 | 7.44 |

EXAMPLE 46

Starting materials:
WS-4545 substance: 24.2 g
tert-Butylthioacetic anhydride: 24.15 g
Solvent for recrystallization:
Ethyl acetate
Acyl derivative:
tert-Butylthioacetic acid ester of WS-4545 substance, colorless needles, yield: 10.5 g., M.P.: 139°–140°C. (dec.)
Analysis for $C_{18}H_{28}O_8N_2S$

|  | C | H |
|---|---|---|
| Calculated: | 49.20 | 6.52 |
| Found: | 49.18 | 6.49 |

EXAMPLE 47

Starting materials:
WS-4545 substance: 35 g
2-tert-butylthiopropionic anhydride: 30 g
Solvent for recrystallization:
Acetonitril
Acyl derivative:
2-tert-butylthionpropionic acid ester of WS-4545 substance, colorless needles, yield: 6.5 g., M.P.: 152°–154°C. (dec.)
Analysis for $C_{19}H_{30}O_8N_2S \cdot 1/8\ H_2O$

|  | C | H | N |
|---|---|---|---|
| Calculated: | 50.85 | 6.74 | 6.24 |
| Found: | 50.80 | 6.77 | 6.33 |

EXAMPLE 48

Preparation of an injection. The required quantities of sterile antibiotic WS-4545 and sterile urea were weighed. Uniformly mixed and distributed into vials, thereby containing 250 mg. of the active ingredient. The vials were sealed hermetically to exclude bacteria. Whenever the vials are required for use, an appropriate amount of a sterile pyrogenfree water is added to the vial and the vial is subjected to administration.

EXAMPLE 49

A suitable formulation of a tablet consists of:

|  |  | Parts |
|---|---|---|
| (1) | Benzoic acid ester of WS-4545 substance | 2 |
| (2) | Mannitol | 90 |
| (3) | Starch | 6 |
| (4) | Magnesium stearate | 2 |

EXAMPLE 50

A suitable formulation of a suppository consists of:

|  |  | Parts |
|---|---|---|
| (1) | Acetic acid ester of WS-4545 substance | 2,500 |
| (2) | Ethylenediaminetetraacetic acid disodium salt dihydrate | 900 |
| (3) | Witepsol H 12 (Registered Trade Mark) | 124,000 |

We claim:
1. A compound selected from the group of compounds represented by the formula wherein $R_1$, $R_2$ and $R_3$ are selected from the group consisting of hydrogen and acyl and may be the same or different, the acyl group being selected from the group consisting of alkanoyl having from 2 to 20 carbon atoms; alkanoyl interrupted by a sulfur atom having 2 to 10 carbon atoms; alkenoyl having from 2 to 10 carbon atoms; benzoyl which may be substituted by one or more substituents selected from the group consisting of halogen, nitro, lower alkyl having from 1 to 4 carbon atoms, lower alkoxy having from 1 to 2 carbon atoms, and alkanoyloxy having from 1 to 4 carbon atoms; lower alkanoyl and lower alkenoyl each substituted by phenyl which may be substituted by halogen or alkoxy having from 1 to 3 carbon atoms, wherein said alkane or alkene moiety may be interrupted by an oxygen atom; lower alkanoyl substituted by thienyl; cyclohexylcarbonyl; 3-methoxycarbonyl-propionyl; and heterocyclic ring carbonyl and benzenefused heterocyclic ring carbonyl, said heterocyclic ring and benzenefused heterocyclic ring being selected from the group consisting of pyridyl, furyl, thienyl, tetrahydrothienyl and benzothiazolinyl.

2. A compound according to claim 1 wherein
  $R_1$ is seleclted from the group consisting of hydrogen and acyl, wherein the acyl group is selected from the group consisting of alkanoyl having from 2 to 20 carbon atoms, crotonoyl, benzoyl, halobenzoyl, 3,4-dimethylbenzoyl, cinnamoyl, nicotinoyl, 2-furoyl, 2-thenoyl, 5-chloro-2-oxo-3-benzothiazolinylacetyl, p-acetoxybenzoyl, β-phenylpropionyl, p-chlorophenoxyacetyl, and cylohexylcarbonyl;

$R_2$ is selected from the group consisting of hydrogen and acyl, wherein the acyl group is selected from the group consisting of lower alkanoyl having 2 to 6 carbon atoms, benzoyl and 2-furoyl; and $R_3$ is selected from the group consisting of hydrogen and acyl, wherein the acyl group is selected from the group consisting of lower alkanoyl having 2-6 carbon atoms and benzoyl.

3. A compound according to claim 1 wherein $R_1$, $R_2$ and $R_3$ are selected from the group consisting of hydrogen and acyl, wherein the acyl is selected from the group consisting of alkanoyl interrupted by sulfur atom having 2 to 10 carbon atoms, alkenoyl having from 2 to 10 carbon atoms, 3-methoxycarbonylpropionyl, 2-(3,4,5-trimethoxy)-phenylacetyl, 3,4,5-trimethoxybenzoyl, phenylacetyl, p-nitrobenzoyl, phenoxyacetyl, thienylacetyl, and tetrahydro-2-thenoyl.

4. A compound according to claim 2 wherein each of $R_1$, $R_2$ and $R_3$ is hydrogen.

5. A compound according to claim 3 wherein $R_1$ is acyl and each of $R_2$ and $R_3$ is hydrogen.

6. A compound according to claim 3 wherein each of $R_1$ and $R_2$ is acyl and $R_3$ is hydrogen.

7. A compound according to claim 3 wherein the acyl group is selected from the group consisting of acetyl, butyryl, benzoyl and 2-furoyl.

8. A compound according to claim 3 wherein each of $R_1$, $R_2$ and $R_3$ is acyl.

9. A compound according to claim 3 wherein $R_1$ is acyl, each of $R_2$ and $R_3$ is hydrogen.

10. A compound according to claim 9 wherein the acyl group of $R_1$ is selected from the group consisting of 3-vinylpropionyl, 3-methylcrotonoyl, 3-methoxycarbonylpropionyl, methylthioacetyl, ethylthioacetyl, isopropylthioacetyl, 2-methylthiopropionyl, t-butylthioacetyl, 2-t-butylthiopropionyl, 2-(3,4,5-trimethoxy)-phenylacetyl, 3,4,5-trimethoxybenzoyl, phenylacetyl, p-nitrobenzoyl, phenoxyacetyl, thienylacetyl, and tetrahydro-2-thenoyl.

* * * * *

UNITED STATES PATENT AND TRADEMARK OFFICE
CERTIFICATE OF CORRECTION

PATENT NO. : 3,923,790
DATED : December 2, 1975
INVENTOR(S) : Imanaka et al.

It is certified that error appears in the above-identified patent and that said Letters Patent are hereby corrected as shown below:

Column 2, line 56, "Whit" should read --White--;
Column 4, line 7, "aerobioc" should read --aerobic--;
Column 5, line 52, "n-butanol" should read --$\underline{n}$-butanol--;
line 54, "n-butanol" should read --$\underline{n}$-butanol--;
Column 6, line 4 (under Example 1), "a 11.7 A" should read
--a=11.7$\overset{\circ}{A}$--
(under Example 2), "a 10.1 A,β 101°"
should read --a=10.1$\overset{\circ}{A}$,β 101°--;
Column 6, line 15, "(cm $^1$):" should read --(cm$^{-1}$):--;
Column 9, line 53, "fulfur" should read --sulfur--;
Column 10, line 40, "acetontrile" should read --acetonitrile--;
Column 11, lines 3 and 6, "radial" should read --radical--;
line 12, "show" should read --shown--;
Column 12, line 68, "assaved" should read --assayed--;
Column 14, line 53, "peletts" should read --pellets--;
line 65, "inn" should read --in--;
Column 15, line 37, "with" should be deleted;
Column 16, line 60, "pr" should read --per--;
Column 17, line 16, "extration" should read --extraction--;
Column 20, line 67, "needless" should read --needles--;
Column 21, line 55, "(1 : 1" should read --(1 : 1)--;
Column 22, line 27, "absorbed" should read --adsorbed--;
line 58, "mixtue" should read --mixture--;

UNITED STATES PATENT AND TRADEMARK OFFICE
CERTIFICATE OF CORRECTION

PATENT NO. : 3,923,790
DATED : December 2, 1975
INVENTOR(S) : Imanaka et al.

It is certified that error appears in the above-identified patent and that said Letters Patent are hereby corrected as shown below:

Column 24, line 1, "liquid" should read --liquor--;
Column 25, line 46, "25" should read --26--.

Signed and Sealed this

Seventh Day of September 1976

[SEAL]

Attest:

RUTH C. MASON
Attesting Officer

C. MARSHALL DANN
Commissioner of Patents and Trademarks